United States Patent
Fujiki et al.

(10) Patent No.: US 11,968,448 B2
(45) Date of Patent: Apr. 23, 2024

(54) IMAGING SUPPORT DEVICE, IMAGING APPARATUS, IMAGING SYSTEM, IMAGING SUPPORT SYSTEM, IMAGING SUPPORT METHOD, AND PROGRAM

(71) Applicant: FUJIFILM CORPORATION, Tokyo (JP)

(72) Inventors: Shinichiro Fujiki, Saitama (JP); Tetsuya Fujikawa, Saitama (JP); Junichi Tanaka, Saitama (JP); Atsushi Kawanago, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/327,214

(22) Filed: Jun. 1, 2023

(65) Prior Publication Data
US 2023/0308757 A1    Sep. 28, 2023

Related U.S. Application Data

(63) Continuation of application No. 17/728,991, filed on Apr. 26, 2022, now Pat. No. 11,711,612, which is a
(Continued)

(30) Foreign Application Priority Data

Oct. 29, 2019   (JP) ................................. 2019-196681

(51) Int. Cl.
*H04N 23/68*     (2023.01)
*H04N 23/695*    (2023.01)

(52) U.S. Cl.
CPC ....... *H04N 23/6811* (2023.01); *H04N 23/687* (2023.01); *H04N 23/695* (2023.01)

(58) Field of Classification Search
CPC .......... G03B 15/00; G03B 17/56; G03B 5/00; H04N 23/687; H04N 23/6811;
(Continued)

(56) References Cited

U.S. PATENT DOCUMENTS 6,266,086 B1    7/2001   Okada et al.
9,749,537 B2 *  8/2017   Yoneyama ........... H04N 23/611
(Continued)

FOREIGN PATENT DOCUMENTS

CN      106257911 A    12/2016
JP      2007-267004 A  10/2007
(Continued)

OTHER PUBLICATIONS

International Search Report issued in International Application No. PCT/JP2020/039425 dated Jan. 12, 2021.
(Continued)

*Primary Examiner* — Pritham D Prabhakher
(74) *Attorney, Agent, or Firm* — SOLARIS Intellectual Property Group, PLLC

(57) ABSTRACT

An imaging support device that supports imaging performed by an imaging apparatus includes an acquisition portion that acquires an in-image shift amount between a predetermined position in a captured image obtained by capturing an imaging region by an imaging element and a position of a target subject image showing a target subject, and a focal length of the imaging apparatus, a derivation portion that derives a movement amount required for moving the position of the target subject image to a specific position by a position adjustment portion which adjusts the position of the target subject image in the captured image, based on the in-image shift amount acquired by the acquisition portion, the focal length acquired by the acquisition portion, and information related to a pixel interval of pixels in the
(Continued)

imaging element, and an output portion that outputs the movement amount derived by the derivation portion.

22 Claims, 21 Drawing Sheets

Related U.S. Application Data continuation of application No. PCT/JP2020/039425, filed on Oct. 20, 2020.

(58) Field of Classification Search
CPC ........... H04N 23/6812; H04N 23/6815; H04N 23/695; H04N 23/682; H04N 23/683; H04N 23/685; F16M 11/10; F16M 11/18; F16M 11/2014; F16M 13/02; G01P 3/36; G02B 27/646; G02B 27/64
USPC ...................................................... 348/208.1
See application file for complete search history.

(56) References Cited

U.S. PATENT DOCUMENTS

| | | | |
|---|---|---|---|
| 10,038,849 B2* | 7/2018 | Sakurai | H04N 23/663 |
| 10,341,563 B2* | 7/2019 | Wada | H04N 23/69 |
| 10,356,301 B2 | 7/2019 | Oshima | |
| 10,484,608 B2 | 11/2019 | Wakamatsu | |
| 10,551,634 B2 | 2/2020 | Gyotoku | |
| 10,708,502 B2* | 7/2020 | Wada | H04N 23/685 |
| 10,764,495 B2 | 9/2020 | Uehara et al. | |
| 2006/0232681 A1* | 10/2006 | Okada | H04N 25/61 348/E5.079 |
| 2007/0035630 A1 | 2/2007 | Lindenstruth et al. | |
| 2007/0237516 A1 | 10/2007 | Seita | |
| 2014/0111659 A1 | 4/2014 | Miyasako et al. | |
| 2015/0085149 A1 | 3/2015 | Tsubaki | |
| 2015/0138322 A1 | 5/2015 | Kawamura | |
| 2015/0358545 A1 | 12/2015 | Wakamatsu | |
| 2016/0134814 A1* | 5/2016 | Yoneyama | H04N 23/698 348/208.11 |
| 2016/0205312 A1 | 7/2016 | Ito et al. | |
| 2017/0163894 A1 | 6/2017 | Wakamatsu | |
| 2017/0272655 A1* | 9/2017 | Sakurai | H04N 23/684 |
| 2017/0272657 A1* | 9/2017 | Ito | H04N 23/67 |
| 2017/0285361 A1* | 10/2017 | Ito | G02B 27/646 |
| 2018/0067334 A1 | 3/2018 | Gyotoku | |
| 2018/0288299 A1* | 10/2018 | Wada | H04N 23/6812 |
| 2018/0288329 A1* | 10/2018 | Wada | G02B 27/646 |
| 2018/0295270 A1 | 10/2018 | Oshima | |
| 2018/0316865 A1 | 11/2018 | Wakamatsu | |
| 2019/0104255 A1 | 4/2019 | Shi et al. | |
| 2019/0191082 A1 | 6/2019 | Uehara et al. | |
| 2019/0191090 A1 | 6/2019 | Murashima et al. | |
| 2019/0251672 A1* | 8/2019 | Lim | G06T 5/003 |
| 2019/0260933 A1* | 8/2019 | Tanaka | H04N 23/81 |

FOREIGN PATENT DOCUMENTS

| | | |
|---|---|---|
| JP | 2008-124850 A | 5/2008 |
| JP | 2013-005009 A | 1/2013 |
| JP | 2017-063340 A | 3/2017 |
| JP | 2017-111430 A | 6/2017 |
| JP | 2017-126960 A | 7/2017 |
| JP | 2017-215350 A | 12/2017 |
| JP | 2018-042098 A | 3/2018 |

OTHER PUBLICATIONS

Written Opinion of the ISA issued in International Application No. PCT/JP2020/039425 dated Jan. 12, 2021.
English language translation of the following: Office action dated Dec. 13, 2022 from the JPO in a Japanese patent application No. 2021-553467 corresponding to the instant patent application.
Notice of Allowance issued by USPTO dated Apr. 5, 2023 in related U.S. Appl. No. 17/728,991.
English language translation of the following: Office action dated Feb. 6, 2024 from the JPO in a Japanese patent application No. 2023-012143 corresponding to the instant patent application. This office action translation is submitted now in order to supplement the understanding of the cited references which are being disclosed in the instant Information Disclosure Statement.
English language translation of the following: Office action dated Jan. 19, 2024 from the SIPO in a Chinese patent application No. 202080075962.7 corresponding to the instant patent application. This office action translation is submitted now in order to supplement the understanding of the cited references which are being disclosed in the instant Information Disclosure Statement.

* cited by examiner

IMAGING SUPPORT DEVICE, IMAGING APPARATUS, IMAGING SYSTEM, IMAGING SUPPORT SYSTEM, IMAGING SUPPORT METHOD, AND PROGRAM

CROSS-REFERENCE TO RELATED APPLICATIONS

This application is a continuation of U.S. Ser. No. 17/728,991, filed on Apr. 26, 2022, which is a continuation application of International Application No. PCT/JP2020/039425, filed Oct. 20, 2020, which claims priority from Japanese Patent Application No. 2019-196681, filed Oct. 29, 2019. The entire disclosure of each of the applications above is incorporated herein by reference.

BACKGROUND

1. Technical Field

The present disclosure relates to an imaging support device, an imaging apparatus, an imaging system, an imaging support system, an imaging support method, and a program.

2. Related Art

JP2017-215350A discloses an image shake correction apparatus comprising an output unit that outputs a shake detection signal related to a shake of the apparatus, a detection unit that detects a subject from a captured image, a notification unit that notifies a capturing state, and a control unit that executes tracking of the subject and image shake correction based on a tracking target position of the detected subject and the shake detection signal using a correction unit, in which the control unit decides which of the tracking of the subject and the image shake correction is to be preferentially executed in accordance with the capturing state.

JP2017-126960A discloses an image shake correction apparatus comprising a position detection unit that detects a position of a subject within a screen, a speed detection unit that detects a speed of the subject using a movement amount of the position of the subject within the screen, a tracking amount calculation unit that calculates a tracking amount which is necessary for moving the subject to a target position within the screen and is a correction amount of a shift unit which moves a subject image on the screen, based on the position of the subject detected immediately before imaging and the speed of the subject in continuous imaging, and a control unit that drives the shift unit based on the tracking amount.

JP2017-063340A discloses an image shake correction apparatus that corrects an image shake based on a shake detection signal using a shake correction unit and comprises an acquisition unit which acquires subject information related to a subject detected from a captured image, and a control unit that sets a reference position of the subject within a capturing angle of view based on the subject information and controls the shake correction unit such that the subject heads toward the reference position.

SUMMARY

One embodiment according to the disclosed technology provides an imaging support device, an imaging apparatus, an imaging system, an imaging support system, an imaging support method, and a program that can support tracking of a target subject in a case of capturing an imaging region including the target subject.

A first aspect according to the disclosed technology is an imaging support device that supports imaging performed by an imaging apparatus including an imaging element and comprises an acquisition portion that acquires an in-image shift amount between a predetermined position in a captured image obtained by capturing an imaging region including a target subject by the imaging element and a position of a target subject image showing the target subject, and a focal length of the imaging apparatus, a derivation portion that derives a movement amount required for moving the position of the target subject image to a specific position by a position adjustment portion which adjusts the position of the target subject image in the captured image, based on the in-image shift amount acquired by the acquisition portion, the focal length acquired by the acquisition portion, and information related to a pixel interval of pixels in the imaging element, and an output portion that outputs the movement amount derived by the derivation portion.

A second aspect according to the disclosed technology is the imaging support device according to the first aspect according to the disclosed technology, in which the position adjustment portion includes a revolution mechanism to which the imaging apparatus is attached and that enables the imaging apparatus to revolve, and a shake correction portion that corrects a shake which occurs due to a vibration exerted on the imaging apparatus, and the imaging support device further includes a control portion that performs an adjustment control of adjusting the position of the target subject image in the captured image by operating at least one of the revolution mechanism or the shake correction portion based on the movement amount.

A third aspect according to the disclosed technology is the imaging support device according to the second aspect according to the disclosed technology, in which the movement amount is decided based on a first movement amount required for adjusting the position of the target subject image by the revolution mechanism and a second movement amount required for adjusting the position of the target subject image by the shake correction portion.

A fourth aspect according to the disclosed technology is the imaging support device according to the second or third aspect according to the disclosed technology, in which the shake correction portion includes a shake correction element that is at least one of a lens for correcting the shake by moving in accordance with the vibration or the imaging element, and at the specific position, the shake correction element is positioned at a center of a movable range of the shake correction element.

A fifth aspect according to the disclosed technology is the imaging support device according to the fourth aspect according to the disclosed technology, in which the acquisition portion further acquires sensitivity of the shake correction portion, and the derivation portion derives, based on a shake correction element shift amount between a center position of the movable range and a current position of the shake correction element, and the sensitivity acquired by the acquisition portion, a shake correction element movement amount required for moving the current position to the center position as a second movement amount required for adjusting the position of the target subject image by the shake correction portion.

A sixth aspect according to the disclosed technology is the imaging support device according to any one of the third to fifth aspects according to the disclosed technology, in which the first movement amount is decided based on a value obtained by dividing a product of the in-image shift amount and the pixel interval by the focal length.

A seventh aspect according to the disclosed technology is the imaging support device according to any one of the third to sixth aspects according to the disclosed technology, in which the movement amount is obtained by combining the first movement amount and the second movement amount derived by the derivation portion.

An eighth aspect according to the disclosed technology is the imaging support device according to any one of the second to seventh aspects according to the disclosed technology, in which the control portion performs correction of the shake by the shake correction portion and the adjustment control in a time-division manner.

A ninth aspect according to the disclosed technology is the imaging support device according to the eighth aspect according to the disclosed technology, in which the control portion causes the shake correction portion to perform the correction of the shake while the imaging apparatus is revolving by the revolution mechanism, and performs the adjustment control while the revolution of the imaging apparatus by the revolution mechanism is stopped.

A tenth aspect according to the disclosed technology is the imaging support device according to the eighth or ninth aspect according to the disclosed technology, in which the adjustment control is a control of adjusting the position of the target subject image by the shake correction portion after the position of the target subject image is adjusted by the revolution mechanism.

An eleventh aspect according to the disclosed technology is the imaging support device according to any one of the second to tenth aspects according to the disclosed technology, in which the revolution mechanism is a 2-axis revolution mechanism that enables the imaging apparatus to revolve in a first direction and a second direction which intersects with the first direction, and the shake correction portion is at least one of an optical shake correction mechanism or an electronic shake correction portion.

A twelfth aspect according to the disclosed technology is the imaging support device according to the eleventh aspect according to the disclosed technology, in which the optical shake correction mechanism is at least one of a lens moving type shake correction mechanism or an imaging element moving type shake correction mechanism.

A thirteenth aspect according to the disclosed technology is the imaging support device according to any one of the first to twelfth aspects according to the disclosed technology, in which the acquisition portion further acquires the information related to the pixel interval.

A fourteenth aspect according to the disclosed technology is the imaging support device according to any one of the first to thirteenth aspects according to the disclosed technology, in which the output portion outputs the movement amount to an outside.

A fifteenth aspect according to the disclosed technology is the imaging support device according to any one of the first to fourteenth aspects according to the disclosed technology, in which the movement amount is decided based on a movement velocity of the target subject in a case where the target subject is moving.

A sixteenth aspect according to the disclosed technology is the imaging support device according to the fifteenth aspect according to the disclosed technology, in which the movement velocity includes a plurality of velocities obtained by decomposing the movement velocity into a plurality of different directions.

A seventeenth aspect according to the disclosed technology is an imaging apparatus comprising the imaging support device according to any one of the first to sixteenth aspects according to the disclosed technology, and the imaging element, in which the imaging support device supports imaging for the imaging element.

An eighteenth aspect according to the disclosed technology is an imaging system comprising the imaging apparatus according to the seventeenth aspect according to the disclosed technology, and a control device that performs at least one of a control of displaying an image on which an adjustment result of the position of the target subject image is reflected based on the movement amount derived by the derivation portion on a display portion, or a control of storing image data indicating the image on which the adjustment result is reflected in a storage portion.

A nineteenth aspect according to the disclosed technology is an imaging system comprising an imaging support device that supports imaging performed by an imaging apparatus including an imaging element, and the imaging element, in which the imaging support device includes an acquisition portion that acquires an in-image shift amount between a predetermined position in a captured image obtained by capturing an imaging region including a target subject by the imaging element and a position of a target subject image showing the target subject, and a focal length of the imaging apparatus, a derivation portion that derives a movement amount required for moving the position of the target subject image to a specific position by a position adjustment portion which adjusts the position of the target subject image in the captured image, based on the in-image shift amount acquired by the acquisition portion, the focal length acquired by the acquisition portion, and information related to a pixel interval of pixels in the imaging element, and an output portion that outputs the movement amount derived by the derivation portion, the position adjustment portion includes a revolution mechanism to which the imaging apparatus is attached and that enables the imaging apparatus to revolve, and a shake correction portion that corrects a shake which occurs due to a vibration exerted on the imaging apparatus, and the imaging support device further includes a control portion that performs an adjustment control of adjusting the position of the target subject image in the captured image by operating at least one of the revolution mechanism or the shake correction portion based on the movement amount.

A twentieth aspect according to the disclosed technology is an imaging support system comprising the imaging support device according to any one of the first to sixteenth aspects according to the disclosed technology, and the position adjustment portion, in which the derivation portion included in the imaging support device derives the movement amount.

A twenty-first aspect according to the disclosed technology is an imaging support method of supporting imaging performed by an imaging apparatus including an imaging element, the imaging support method comprising acquiring an in-image shift amount between a predetermined position in a captured image obtained by capturing an imaging region including a target subject by the imaging element and a position of a target subject image showing the target subject, and a focal length, deriving a movement amount required for moving the position of the target subject image to a specific position by a position adjustment portion which adjusts the position of the target subject image in the captured image, based on the acquired in-image shift amount, the acquired focal length, and a pixel interval of pixels of the imaging element, and outputting the derived movement amount.

A twenty-second aspect according to the disclosed technology is a program causing a computer to execute a process of supporting imaging performed by an imaging apparatus including an imaging element, the process comprising acquiring an in-image shift amount between a predetermined position in a captured image obtained by capturing an imaging region including a target subject by the imaging element and a position of a target subject image showing the target subject, and a focal length, deriving a movement amount required for moving the position of the target subject image to a specific position by a position adjustment portion which adjusts the position of the target subject image in the captured image, based on the acquired in-image shift amount, the acquired focal length, and a pixel interval of pixels of the imaging element, and outputting the derived movement amount.

BRIEF DESCRIPTION OF THE DRAWINGS

Exemplary embodiments of the technology of the disclosure will be described in detail based on the following figures, wherein.

DETAILED DESCRIPTION

An example of an embodiment according to the disclosed technology will be described in accordance with the appended drawings.

First, words used in the following description will be described.

CPU is an abbreviation for "Central Processing Unit". GPU is an abbreviation for "Graphics Processing Unit". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". SoC is an abbreviation for "System-on-a-chip". SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". I/F is an abbreviation for "Interface". UI is an abbreviation for "User Interface". WAN is an abbreviation for "Wide Area Network". ISP is an abbreviation for "Image Signal Processor". CMOS is an abbreviation for "Complementary Metal Oxide Semiconductor". CCD is an abbreviation for "Charge Coupled Device". SWIR is an abbreviation for "Short-Wavelength Infrared".

In the description of the present specification, "vertical" refers to being vertical in a sense of not only being completely vertical but also including an error generally allowed in the technical field to which the disclosed technology belongs. In the description of the present specification, "horizontal" refers to being horizontal in a sense of not only being completely horizontal but also including an error generally allowed in the technical field to which the disclosed technology belongs. In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs. In the description of the present specification, "same" refers to being the same in a sense of not only being completely the same but also including an error generally allowed in the technical field to which the disclosed technology belongs.

First Embodiment

Figure 1:
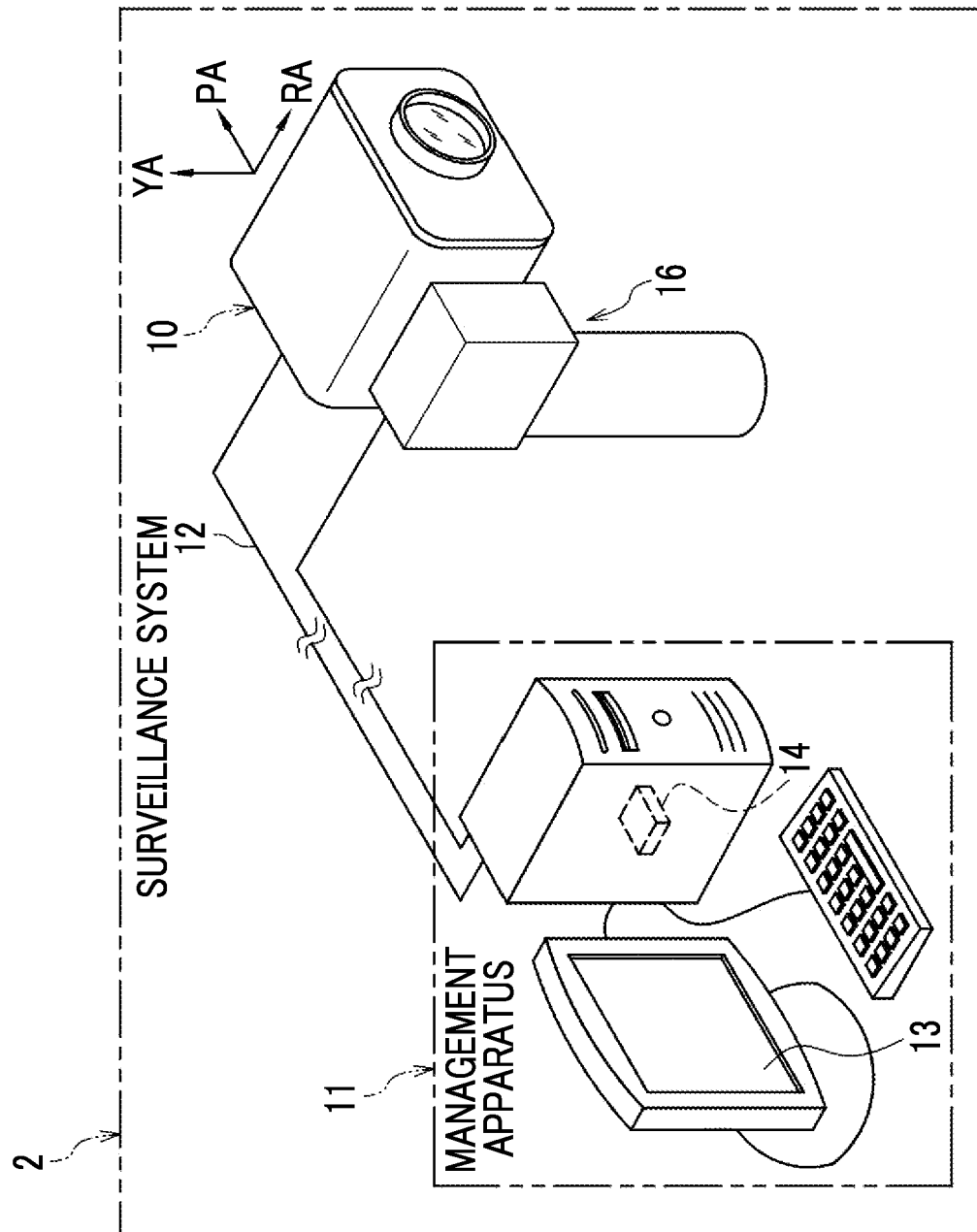
FIG. 1 is a schematic configuration diagram illustrating an example of a configuration of a surveillance system according to an embodiment.

As illustrated in FIG. 1 as an example, a surveillance system 2 comprises a surveillance camera 10 and a management apparatus 11. The surveillance system 2 is an example of an "imaging system" and an "imaging support system" according to the embodiment of the disclosed technology. The surveillance camera 10 is an example of an "imaging apparatus" according to the embodiment of the disclosed technology.

The surveillance camera 10 is installed in an indoor or outdoor post or wall, a part (for example, a rooftop) of a building, or the like through a revolution mechanism 16, described later, images a surveillance target that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13 and a secondary storage device 14. Examples of the display 13 include a liquid crystal display or an organic EL display. The display 13 is an example of a "display portion (display)" according to the embodiment of the disclosed technology.

Examples of the secondary storage device 14 include an HDD. The secondary storage device 14 may be a non-volatile memory such as a flash memory, an SSD, or an EEPROM instead of the HDD. The secondary storage device 14 is an example of a "storage portion (storage device)" according to the embodiment of the disclosed technology.

In the management apparatus 11, the motion picture image transmitted by the surveillance camera 10 is received, and the received motion picture image is displayed on the display 13 or stored in the secondary storage device 14.

Figure 2:
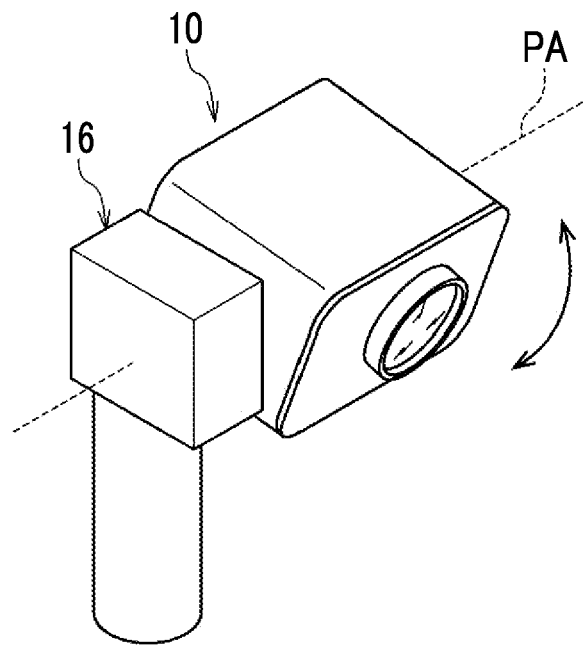
FIG. 2 is a perspective view illustrating an example of an exterior of a surveillance camera according to the embodiment.
Figure 3:
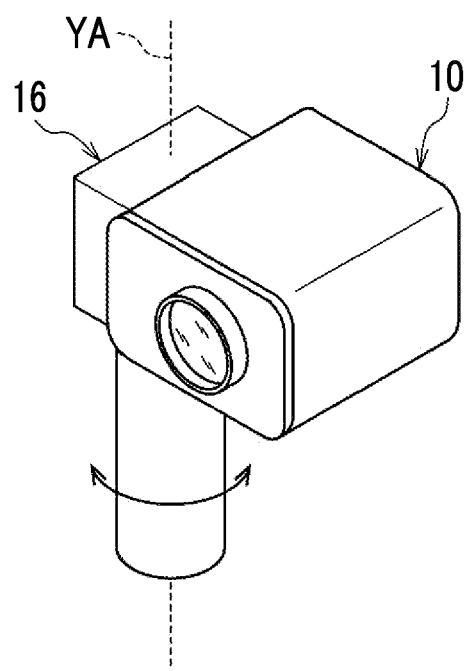
FIG. 3 is a perspective view illustrating an example of the exterior of the surveillance camera according to the embodiment.

The surveillance camera 10 is attached to the revolution mechanism 16. The revolution mechanism 16 enables the surveillance camera 10 to revolve. Specifically, the revolution mechanism 16 is a 2-axis revolution mechanism that enables the surveillance camera 10 to revolve in a first direction and a second direction intersecting with the first direction. As illustrated in FIG. 2 as an example, the revolution mechanism 16 enables the surveillance camera 10 to revolve in a revolution direction (hereinafter referred to as a "pitch direction") of which a central axis is a pitch axis PA. In addition, as illustrated in FIG. 3 as an example, the revolution mechanism 16 enables the surveillance camera 10 to revolve in a revolution direction (hereinafter referred to as a "yaw direction") of which a central axis is a yaw axis YA. The revolution mechanism 16 is an example of a "revolution mechanism" according to the embodiment of the disclosed technology. In addition, the "pitch direction" is an example of a "first direction" according to the embodiment of the disclosed technology, and the yaw direction is an example of a "second direction" according to the embodiment of the disclosed technology. In the present embodiment, while the 2-axis revolution mechanism is illustrated as the revolution mechanism 16, the disclosed technology is not limited thereto. The disclosed technology is also established in a case where a 3-axis revolution mechanism is applied.

Figure 4:
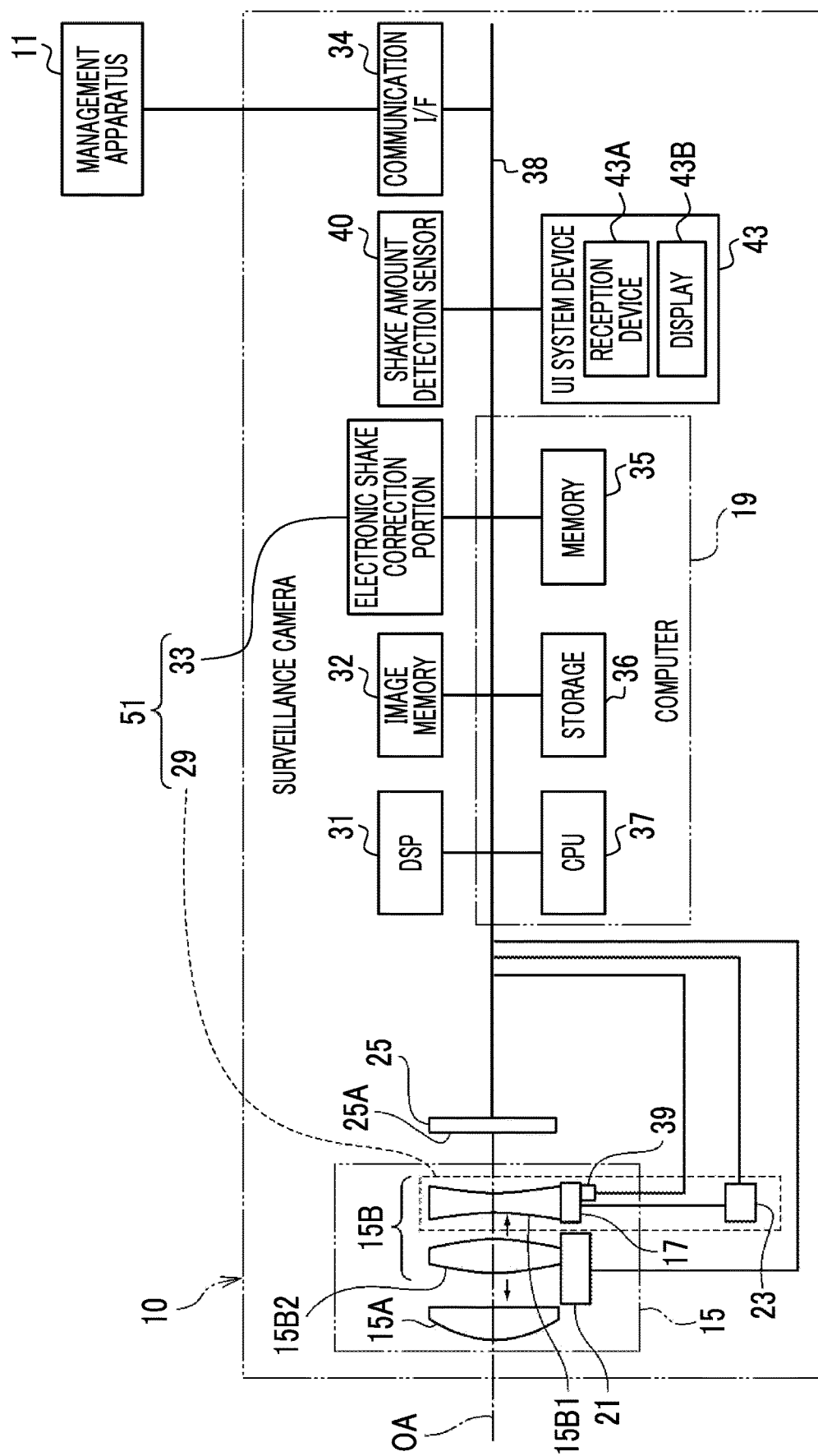
FIG. 4 is a block diagram illustrating an example of a configuration of an optical system and an electric system of the surveillance camera according to the embodiment.

As illustrated in FIG. 4 as an example, the surveillance camera 10 comprises an optical system 15 and an imaging element 25. The imaging element 25 is positioned on a rear stage of the optical system 15. The optical system 15 comprises an objective lens 15A and a lens group 15B. The objective lens 15A and the lens group 15B are arranged in an order of the objective lens 15A and the lens group 15B along an optical axis OA of the optical system 15 from the surveillance target side (object side) to a light-receiving surface 25A side (image side) of the imaging element 25. The lens group 15B includes a zoom lens 15B2 and the like. The zoom lens 15B2 is movably supported along the optical axis OA by a moving mechanism 21. The moving mechanism 21 moves the zoom lens 15B2 along the optical axis OA in accordance with motive power provided from a motor (not illustrated) for the zoom lens. In addition, the lens group 15B includes an anti-vibration lens 15B 1. The anti-vibration lens 15B1 changes in a direction perpendicular to an optical axis of the anti-vibration lens 15B1 in accordance with the provided motive power.

By the optical system 15 configured in such a manner, an image of surveillance target light showing the surveillance target is formed on the light-receiving surface 25A. The imaging element 25 is an example of an "imaging element" according to the embodiment of the disclosed technology.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. In addition, examples of the vibration exerted on the surveillance camera 10 include a vibration during revolution of the surveillance camera 10 by the revolution mechanism 16, a vibration in a case where a revolution operation performed by the revolution mechanism 16 is started or stopped, and the like. Thus, in the surveillance camera 10, a shake occurs due to the vibration exerted on the surveillance camera 10 (hereinafter, simply referred to as the "vibration").

In the present embodiment, the "shake" refers to a phenomenon in which a subject image on the light-receiving surface 25A changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs). Hereinafter, the shake that occurs due to the vibration will be simply referred to as the "shake".

Therefore, the surveillance camera 10 comprises a shake correction portion 51. The shake correction portion 51 is an example of a "shake correction component" according to the embodiment of the disclosed technology. The shake correction portion 51 includes a mechanical shake correction portion 29 and an electronic shake correction portion 33. The shake correction portion 51 corrects the shake. The mechanical shake correction portion 29 is an example of an "optical shake correction mechanism" according to the embodiment of the disclosed technology. The mechanical shake correction portion 29 is a mechanism that corrects the shake by applying motive power generated by a driving source such as a motor (for example, a voice coil motor) to the anti-vibration lens to move the anti-vibration lens in a direction perpendicular to an optical axis of an imaging optical system. The electronic shake correction portion 33 corrects the shake by performing image processing on a captured image based on a shake amount. That is, the shake correction portion 51 mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. In the present embodiment, "correction of the shake" includes a meaning of removing the shake and also a meaning of reducing the shake.

The mechanical shake correction portion 29 comprises the anti-vibration lens 15B1, an actuator 17, a driver 23, and a position detection sensor 39.

Various well-known methods can be employed as a method of correcting the shake by the mechanical shake correction portion 29. In the present embodiment, a method of correcting the shake by moving the anti-vibration lens 15B1 based on the shake amount detected by a shake amount detection sensor 40 (described later) is employed as the method of correcting the shake. Specifically, the shake is corrected by moving the anti-vibration lens 15B1 in a direction of canceling the shake by an amount with which the shake is canceled.

The actuator 17 is attached to the anti-vibration lens 15B1. The actuator 17 is a shift mechanism in which a voice coil motor is mounted, and changes the anti-vibration lens 15B1 in the direction perpendicular to the optical axis of the anti-vibration lens 15B1 by driving the voice coil motor. Here, while the shift mechanism in which the voice coil motor is mounted is employed as the actuator 17, the disclosed technology is not limited thereto. Other motive power sources such as a stepping motor or a piezo element may be applied instead of the voice coil motor.

The actuator 17 is controlled by the driver 23. Driving the actuator 17 under control of the driver 23 mechanically changes a position of the anti-vibration lens 15B1 with respect to the optical axis OA.

The position detection sensor 39 detects the current position of the anti-vibration lens 15B1 and outputs a position signal indicating the detected current position. Here, a device including a hall element is employed as an example of the position detection sensor 39. Here, the current position of the anti-vibration lens 15B1 refers to the current position in a two-dimensional plane of the anti-vibration lens. The two-dimensional plane of the anti-vibration lens refers to a two-dimensional plane perpendicular to the optical axis of the anti-vibration lens 15B1. In the present embodiment, while the device including the hall element is employed as an example of the position detection sensor 39, the disclosed technology is not limited thereto. A magnetic sensor, a photosensor, or the like may be employed instead of the hall element.

The surveillance camera 10 comprises a computer 19, a DSP 31, an image memory 32, the electronic shake correction portion 33, a communication I/F 34, the shake amount detection sensor 40, and a UI system device 43. The computer 19 comprises a memory 35, a storage 36, and a CPU 37. The electronic shake correction portion 33 is an example of an "electronic shake correction portion" according to the embodiment of the disclosed technology. In addition, the CPU 37 is an example of an "imaging support device" according to the embodiment of the disclosed technology.

The imaging element 25, the DSP 31, the image memory 32, the electronic shake correction portion 33, the communication I/F 34, the memory 35, the storage 36, the CPU 37, the shake amount detection sensor 40, and the UI system device 43 are connected to a bus 38. In addition, the driver 23 is connected to the bus 38. In the example illustrated in FIG. 4, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used. The storage 36 is a non-volatile storage device. Here, a flash memory is employed as an example of the storage 36. The flash memory is merely an example. Examples of the storage 36 include various non-volatile memories such as a magnetoresistive memory and/or a ferroelectric memory instead of the flash memory or together with the flash memory. In addition, the non-volatile storage device may be an EEPROM, an HDD, and/or an SSD or the like. The storage 36 stores various programs for the surveillance camera 10. The CPU 37 controls the entire surveillance camera 10 by reading out various programs from the storage 36 and executing the read various programs on the memory 35.

The imaging element 25 is a CMOS image sensor. The imaging element 25 images the surveillance target at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction output by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A is formed with a plurality of photosensitive pixels (not illustrated) arranged in a matrix. In the imaging element 25, photoelectric conversion is performed for each photosensitive pixel by exposing each photosensitive pixel. Charges obtained by performing the photoelectric conversion for each photosensitive pixel correspond to an analog imaging signal indicating the surveillance target. Here, a plurality of photoelectric conversion elements (for example, photoelectric conversion elements in which color filters are arranged) having sensitivity to visible light are employed as the plurality of photosensitive pixels. In the imaging element 25, a photoelectric conversion element having sensitivity to light of red (R) (for example, a photoelectric conversion element in which an R filter corresponding to R is arranged), a photoelectric conversion element having sensitivity to light of green (G) (for example, a photoelectric conversion element in which a G filter corresponding to G is arranged), and a photoelectric conversion element having sensitivity to light of blue (B) (for example, a photoelectric conversion element in which a B filter corresponding to B is arranged) are employed as the plurality of photoelectric conversion elements. In the surveillance camera 10, imaging based on the visible light (for example, light on a short wavelength side of less than or equal to approximately 700 nanometers) is performed using these photosensitive pixels. However, the present embodiment is not limited thereto. Imaging based on infrared light (for example, light on a long wavelength side of greater than approximately 700 nanometers) may be performed. In this case, a plurality of photoelectric conversion elements having sensitivity to the infrared light may be used as the plurality of photosensitive pixels. Particularly, for example, an InGaAs sensor and/or a type-2 quantum well (T2SL; Simulation of Type-II Quantum Well) sensor may be used for imaging for SWIR.

The imaging element 25 generates a digital image that is a digital imaging signal by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount detection sensor 40 is, for example, a device including a gyro sensor and detects the shake amount of the surveillance camera 10. In other words, the shake amount detection sensor 40 detects the shake amount for each of a pair of axial directions. The gyro sensor detects an amount of a rotational shake about each axis (refer to FIG. 1) of the pitch axis PA, the yaw axis YA, and a roll axis RA (axis parallel to the optical axis OA). The shake amount detection sensor 40 detects the shake amount of the surveillance camera 10 by converting the amount of the rotational shake about the pitch axis PA and the amount of the rotational shake about the yaw axis YA detected by the gyro sensor into a shake amount in a two-dimensional plane parallel to the pitch axis PA and the yaw axis YA.

Here, while the gyro sensor is illustrated as an example of the shake amount detection sensor 40, this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

In addition, here, while an example of a form of detecting the shake amount by the shake amount detection sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount detection sensor 40 and controls the mechanical shake correction portion 29 and the electronic shake correction portion 33 based on the acquired shake amount. The shake amount detected by the shake amount detection sensor 40 is used for correction of the shake by each of the mechanical shake correction portion 29 and the electronic shake correction portion 33. The mechanical shake correction portion 29 and the electronic shake correction portion 33 correct the shake in accordance with the shake amount detected by the shake amount detection sensor 40.

The electronic shake correction portion 33 is a device including an ASIC. The electronic shake correction portion 33 corrects the shake by performing the image processing on the captured image in the image memory 32 based on the shake amount detected by the shake amount detection sensor 40.

Here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication I/F 34 is, for example, a network interface and controls transfer of various information with respect to the management apparatus 11 through a network. Examples of the network include a WAN such as the Internet or a public communication network. Communication between the surveillance camera 10 and the management apparatus 11 is controlled.

The UI system device 43 comprises a reception device 43A and a display 43B. For example, the reception device 43A includes a hard key and a touch panel and receives various instructions from a user or the like of the surveillance system 2 (hereinafter, simply referred to as the "user or the like"). The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

Figure 5:
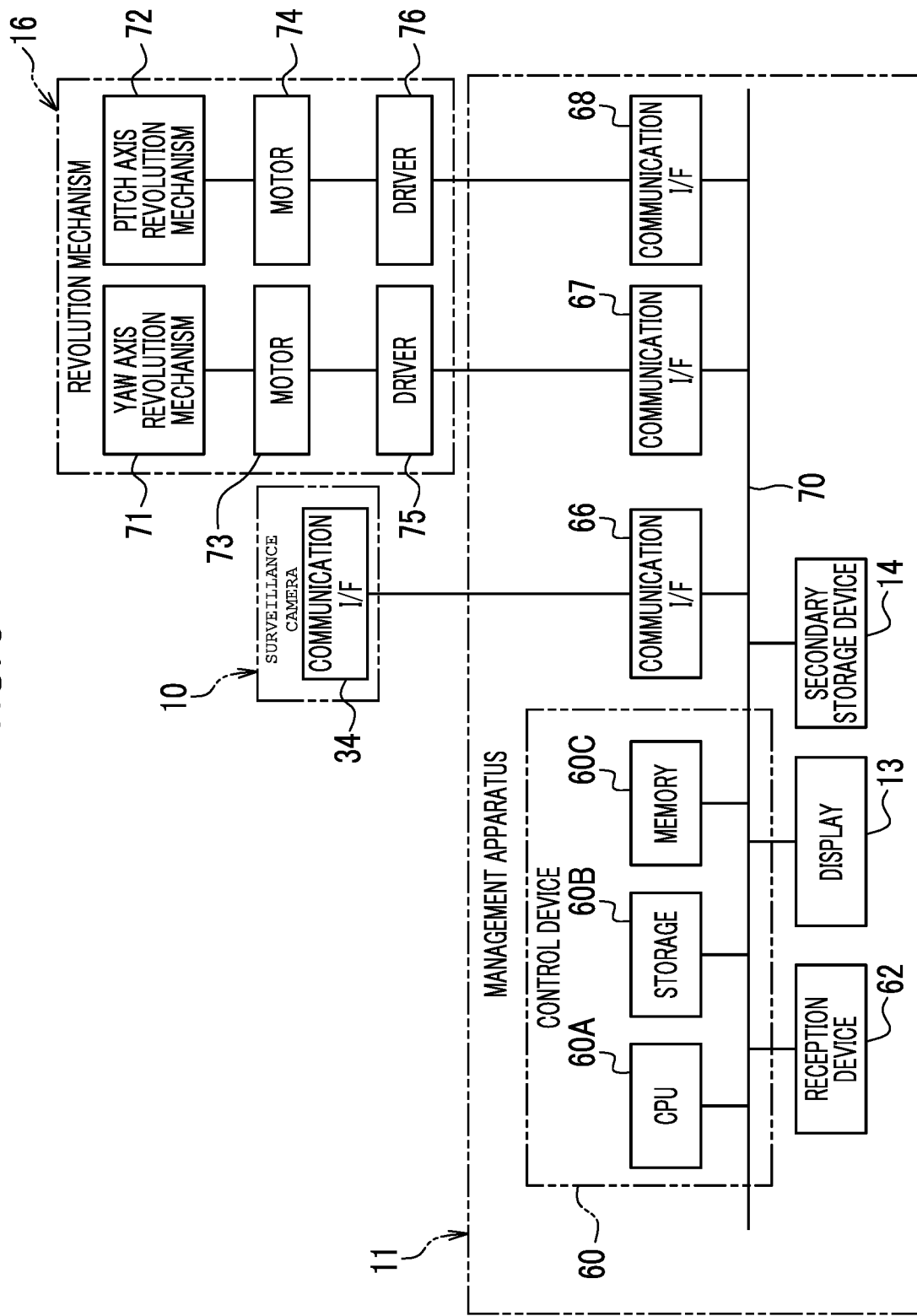
FIG. 5 is a block diagram illustrating an example of a configuration of an electric system of a management apparatus and a revolution mechanism according to the embodiment.

As illustrated in FIG. 5 as an example, the revolution mechanism 16 comprises a yaw axis revolution mechanism 71, a pitch axis revolution mechanism 72, a motor 73, a motor 74, a driver 75, and a driver 76. The yaw axis revolution mechanism 71 causes the surveillance camera 10 to revolve in the yaw direction. The motor 73 is driven to generate motive power under control of the driver 75. The yaw axis revolution mechanism 71 causes the surveillance camera 10 to revolve in the yaw direction by receiving the motive power generated by the motor 73. The motor 74 is driven to generate motive power under control of the driver 76. The pitch axis revolution mechanism 72 causes the surveillance camera 10 to revolve in the pitch direction by receiving the motive power generated by the motor 74.

As illustrated in FIG. 5 as an example, the management apparatus 11 comprises the display 13, the secondary storage device 14, a control device 60, a reception device 62, and communication I/Fs 66 to 68. The control device 60 comprises a CPU 60A, a storage 60B, and a memory 60C. Each of the reception device 62, the display 13, the CPU 60A, the storage 60B, the memory 60C, and the communication I/Fs 66 to 68 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B is a non-volatile storage device. Here, a flash memory is employed as an example of the storage 60B. The flash memory is merely an example. Examples of the storage 60B include various non-volatile memories such as a magnetoresistive memory and/or a ferroelectric memory instead of the flash memory or together with the flash memory. In addition, the non-volatile storage device may be an EEPROM, an HDD, and/or an SSD or the like. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C.

The communication I/F 66 is, for example, a network interface. The communication I/F 66 is communicably connected to the communication I/F 34 of the surveillance camera 10 through a network and controls transfer of various information with respect to the surveillance camera 10. For example, the communication I/F 66 requests the surveillance camera 10 to transmit the captured image and receives the captured image transmitted from the communication I/F 34 of the surveillance camera 10 in response to the request for transmission of the captured image.

The communication I/Fs 67 and 68 are, for example, network interfaces. The communication I/F 67 is communicably connected to the driver 75 through a network. The CPU 60A controls a revolution operation of the yaw axis revolution mechanism 71 by controlling the motor 73 through the communication I/F 67 and the driver 75. The communication I/F 68 is communicably connected to the driver 76 through a network. The CPU 60A controls a revolution operation of the pitch axis revolution mechanism 72 by controlling the motor 74 through the communication I/F 68 and the driver 76.

The reception device 62 includes, for example, a keyboard, a mouse, and a touch panel and receives various instructions from the user or the like. The CPU 60A acquires the various instructions received by the reception device 62 and operates in accordance with the acquired instructions.

The display 13 displays various information under control of the CPU 60A. Examples of the various information displayed on the display 13 include contents of the various instructions received by the reception device 62 and the captured image received by the communication I/F 66.

The secondary storage device 14 stores various information under control of the CPU 60A. Examples of the various information stored in the secondary storage device 14 include the captured image received by the communication I/F 66.

In such a manner, the control device 60 performs a control of displaying the captured image received by the communication I/F 66 on the display 13 and a control of storing the captured image received by the communication I/F 66 in the secondary storage device 14. The captured image displayed on the display 13 is an example of an "image on which an adjustment result of a position of a target subject image is reflected" according to the embodiment of the disclosed technology. In addition, the captured image stored in the secondary storage device 14 is an example of "image data" according to the embodiment of the disclosed technology.

Here, while the captured image is displayed on the display 13, and the captured image received by the communication I/F 66 is stored in the secondary storage device 14, the disclosed technology is not limited thereto. For example, any of the display of the captured image on the display 13 and the storage of the captured image in the secondary storage device 14 may be performed.

The surveillance camera 10 is provided with a function (hereinafter, referred to as a "tracking function") of tracking the target subject. In a case of tracking the target subject by the tracking function, it is preferable that a position, in the captured image, of the target subject image showing the target subject (for example, a specific person) included in the imaging region is set to a predetermined position in the captured image in order to deal with movement of the target subject. For example, in a case where the position of the target subject image is set to a center position of the captured image, it is possible to deal with a change in position of the target subject image in various directions.

Figure 6:
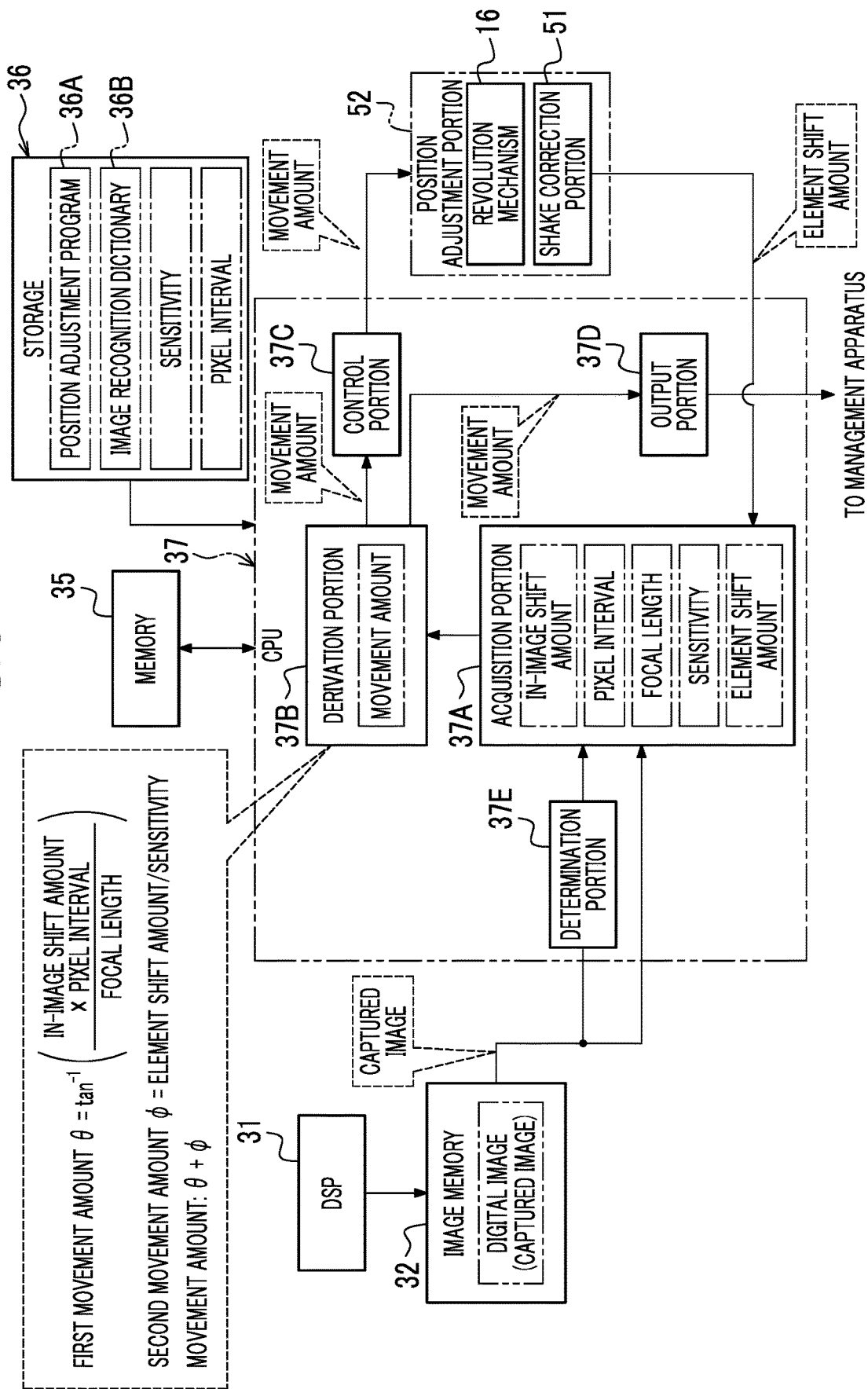
FIG. 6 is a function block diagram illustrating an example of functions of a CPU included in the surveillance camera according to the embodiment.

Therefore, in order to set the position of the target subject image in the captured image to the predetermined position in the captured image, as illustrated in FIG. 6 as an example, a position adjustment program 36A is stored in the storage 36, and the position adjustment program 36A is executed by the CPU 37. Specifically, the CPU 37 functions as the imaging support device that supports imaging performed by the surveillance camera 10 including the imaging element 25, by reading out the position adjustment program 36A from the storage 36 and executing the read position adjustment program 36A on the memory 35. In such a manner, by functioning as the imaging support device, the CPU 37 supports imaging under a state where the position of the target subject image of the surveillance camera 10 is set to the center position (hereinafter, referred to as an "image center position") of the captured image. The image center position is an example of a "predetermined position" and a "specific position" according to the embodiment of the disclosed technology.

In order to implement support of imaging under a state where the position of the target subject image of the surveillance camera 10 is set to the specific position, the surveillance camera 10 comprises a position adjustment portion 52. The position adjustment portion 52 includes the revolution mechanism 16 and the shake correction portion 51 and adjusts the position of the target subject image in the captured image. The CPU 37 supports imaging performed by the surveillance camera 10 by controlling the position adjustment portion 52. The position adjustment portion 52 is an example of a "position adjustment device" according to the embodiment of the disclosed technology.

In addition, the CPU 37 derives a movement amount required for moving the position of the target subject image to the image center position by the position adjustment portion 52 based on various information. In addition, the CPU 37 outputs the derived movement amount. By controlling the position adjustment portion 52 based on the movement amount, the position of the target subject image can be set to the image center position, and tracking of the target subject is supported.

The CPU 37 operates as an acquisition portion 37A, a derivation portion 37B, a control portion 37C, an output portion 37D, and a determination portion 37E by executing the position adjustment program 36A on the memory 35. The acquisition portion 37A is an example of an "acquisition portion" according to the embodiment of the disclosed technology. The derivation portion 37B is an example of a "derivation portion" according to the embodiment of the disclosed technology. The control portion 37C is an example of a "control portion" according to the embodiment of the disclosed technology. The output portion 37D is an example of an "output portion" according to the embodiment of the disclosed technology. The CPU 37 is an example of a "processor" according to the embodiment of the disclosed technology. The memory 35 is an example of a "memory" according to the embodiment of the disclosed technology.

The determination portion 37E acquires the captured image from the image memory 32 and performs image recognition of the target subject image on the acquired captured image. The storage 36 stores an image recognition dictionary 36B. The target subject image (for example, an image showing a specific object) as an image recognition target is registered in the image recognition dictionary 36B. The determination portion 37E determines whether or not the target subject image is included in the captured image by referring to the image recognition dictionary 36B of the storage 36. In addition, in a case where the target subject image is included in the captured image, the determination portion 37E determines whether or not the position of the target subject image is at the image center position.

Figure 7:
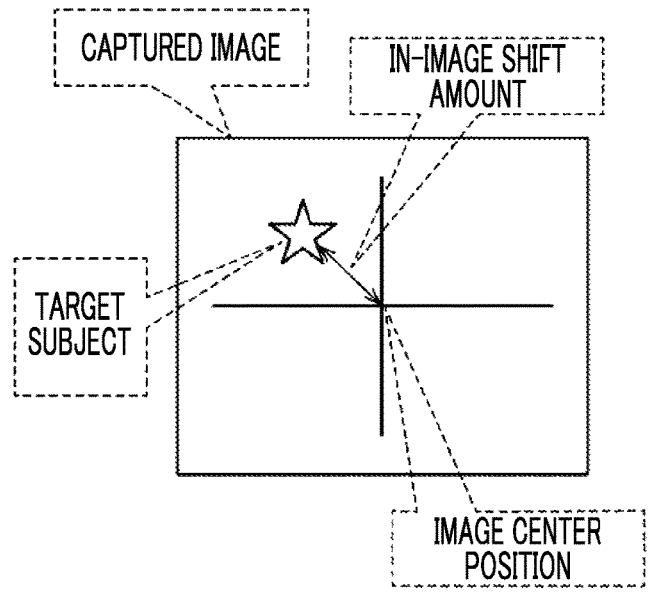
FIG. 7 is a conceptual diagram illustrating an example of a captured image according to the embodiment.

In a case where the determination portion 37E determines that the position of the target subject image is at the image center position, the acquisition portion 37A acquires the captured image from the image memory 32 and acquires a shift amount (hereinafter, referred to as an "in-image shift amount") between the image center position and the position of the target subject image by referring to the acquired captured image. The acquisition portion 37A calculates the shift amount of pixel coordinates of the target subject image with respect to the image center position (refer to FIG. 7). The shift amount of the pixel coordinates is an example of an "in-image shift amount" according to the embodiment of the disclosed technology.

The acquisition portion 37A acquires a focal length of the surveillance camera 10. Specifically, the acquisition portion 37A performs surveillance of a position of the zoom lens 15B2 on the optical axis OA and derives the focal length based on the surveillance result. For example, the derivation of the focal length is implemented using, by the acquisition portion 37A, a focal length derivation table in which the surveillance result and the focal length are associated with each other, or a focal length derivation calculation expression that takes the surveillance result as an independent variable and takes the focal length as a dependent variable.

The storage 36 stores sensitivity of the shake correction portion 51 (hereinafter, simply referred to as the "sensitivity") and a pixel interval of pixels of the imaging element 25 (hereinafter, simply referred to as the "pixel interval"). The acquisition portion 37A acquires the sensitivity from the storage 36. Here, the sensitivity is a product of a movement amount of the imaging region in the light-receiving surface 25A per unit shake angle and a movable amount of the shake correction portion 51 necessary for moving the imaging region in the light-receiving surface 25A by 1 degree. In addition, the acquisition portion 37A acquires the pixel interval from the storage 36.

The derivation portion 37B derives the movement amount required for moving the position of the target subject image to the image center position by the position adjustment portion 52. Specifically, the derivation portion 37B derives the movement amount based on the in-image shift amount acquired by the acquisition portion 37A, the focal length acquired by the acquisition portion 37A, and the pixel interval. The pixel interval is an example of "information related to a pixel interval" according to the embodiment of the disclosed technology.

Here, while an example of a form of storing the pixel interval in the storage 36 and acquiring the pixel interval from the storage 36 by the acquisition portion 37A is illustrated, the disclosed technology is not limited thereto. The pixel interval may be derived from a size and the number of pixels of the captured image by the acquisition portion 37A or the derivation portion 37B. In this case, information related to the size and the number of pixels of the captured image is an example of the "information related to the pixel interval" according to the embodiment of the disclosed technology.

In addition, the acquisition portion 37A may acquire the information related to the pixel interval from the imaging element 25. In this case, the derivation portion 37B may use the information related to the pixel interval acquired by the acquisition portion 37A as the information related to the pixel interval in deriving the movement amount.

The control portion 37C performs an adjustment control of adjusting the position of the target subject image in the captured image by operating the position adjustment portion 52 based on the movement amount derived by the derivation portion 37B. The control portion 37C performs the adjustment control of adjusting the position of the target subject image in the captured image by operating the revolution mechanism 16 and the shake correction portion 51 included in the position adjustment portion 52 based on the movement amount derived by the derivation portion 37B.

Here, while an example of a form of operating both of the revolution mechanism 16 and the shake correction portion 51 of the position adjustment portion 52 by the control portion 37C is illustratively described, the disclosed technology is not limited thereto. For example, the control portion 37C may operate the revolution mechanism 16 or the shake correction portion 51 based on the movement amount derived by the derivation portion 37B.

The control portion 37C performs the correction of the shake by the shake correction portion 51 and the adjustment control of adjusting the position of the target subject image in the captured image in a time-division manner. Specifically, while the surveillance camera 10 is revolving by the revolution mechanism 16, the control portion 37C causes the shake correction portion 51 to correct the shake. While the revolution (hereinafter, referred to as "revolution at a time of non-adjustment") of the surveillance camera 10 by the revolution mechanism 16 is stopped, the control portion 37C performs the adjustment control. Here, the revolution of the surveillance camera 10 by the revolution mechanism 16 is broadly divided into the revolution at the time of non-adjustment (revolution at a normal time) and the revolution at a time of adjustment (revolution at other than the normal time). The revolution at the time of adjustment refers to the revolution at the time of adjustment of the position of the target subject image by the revolution mechanism 16 operated by performing the adjustment control. In other words, the time of adjustment refers to a timing different from the time of non-adjustment. In still other words, the time of adjustment refers to a timing at which the correction of the shake by the shake correction portion 51 is not performed. As the adjustment control, the control portion 37C controls the revolution mechanism 16 and the shake correction portion 51 such that the position of the target subject image is adjusted by the shake correction portion 51 after the position of the target subject image is adjusted by the revolution mechanism 16.

The output portion 37D outputs the movement amount derived by the derivation portion 37B. Specifically, the output portion 37D outputs the movement amount derived by the derivation portion 37B to the management apparatus 11. The management apparatus 11 is an example of an "outside" according to the embodiment of the disclosed technology.

Next, an example of a method of deriving the movement amount derived by the derivation portion 37B (hereinafter, simply referred to as the "movement amount") will be described. The movement amount is decided based on a first movement amount required for adjusting the position of the target subject image by the revolution mechanism 16 and a second movement amount required for adjusting the position of the target subject image by the shake correction portion 51. Specifically, the movement amount derived by the derivation portion 37B is decided by combining the first movement amount related to the revolution mechanism 16 and the second movement amount related to the shake correction portion 51.

Figure 8:
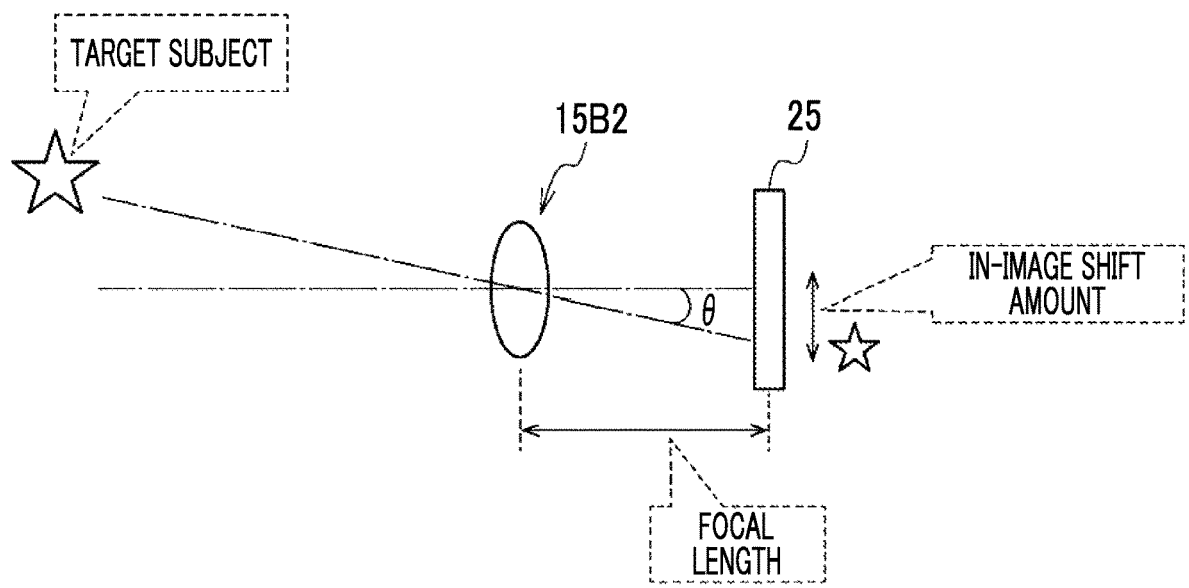
FIG. 8 is a conceptual diagram for describing derivation of a first movement amount according to the embodiment.

As illustrated in FIG. 8 as an example, the first movement amount is decided based on a value obtained by dividing a product of the in-image shift amount and the pixel interval by the focal length. For example, the derivation portion 37B derives the first movement amount using Calculation Expression (1) below. A pan tilt angle θ obtained by Calculation Expression (1) below is an example of a "first movement amount" according to the embodiment of the disclosed technology.

$$\theta = \arctan(p \times t/L) \quad (1)$$

In Calculation Expression (1), θ denotes a pan tilt angle [deg], p denotes the shift amount [pixel] of the pixel coordinates of the position of the target subject image, t denotes the pixel interval [mm/pixel] of the imaging element, and L denotes the focal length [mm].

Figure 9:
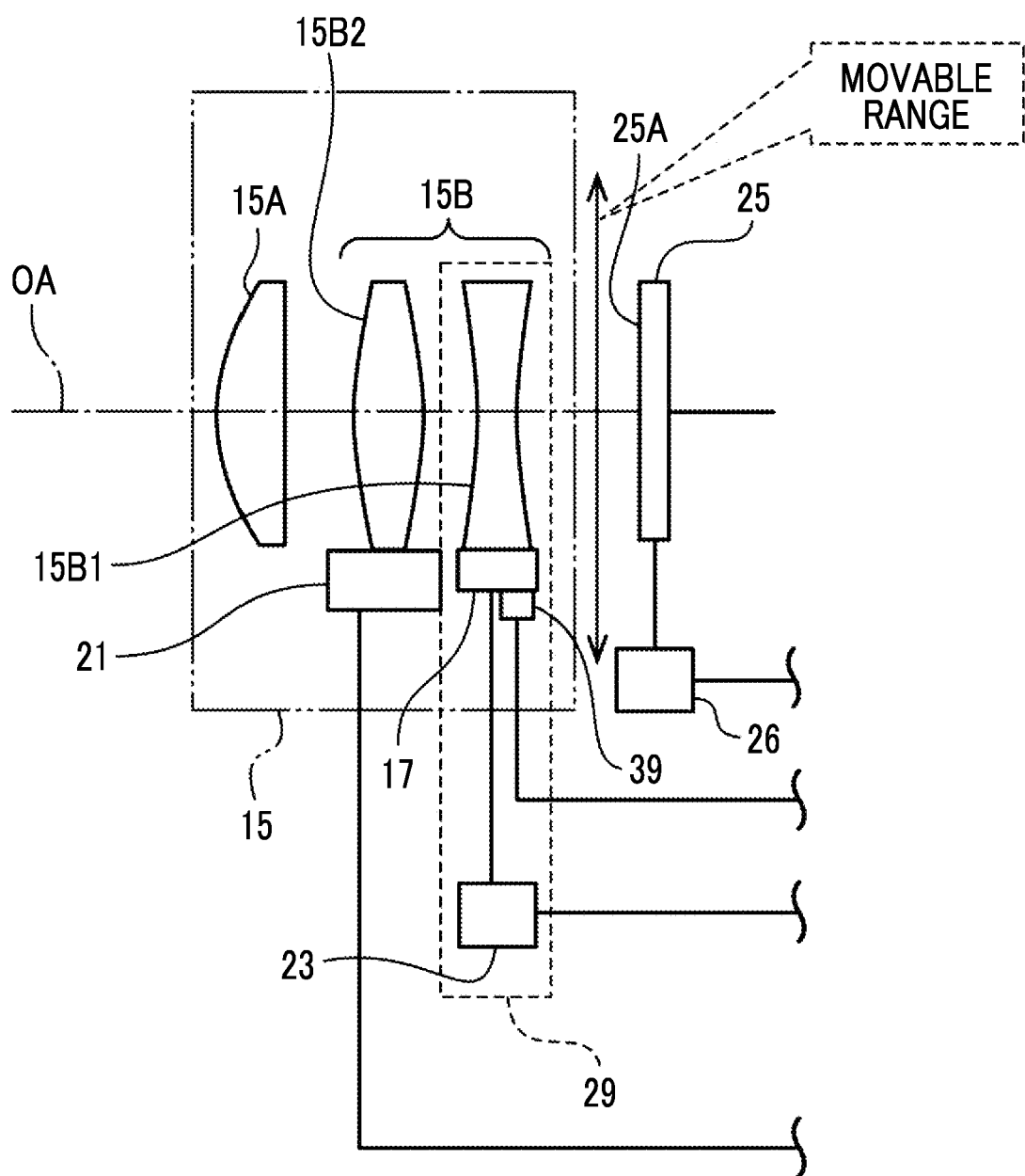
FIG. 9 is a conceptual diagram for describing a movable range of a shake correction element according to the embodiment.
Figure 10:
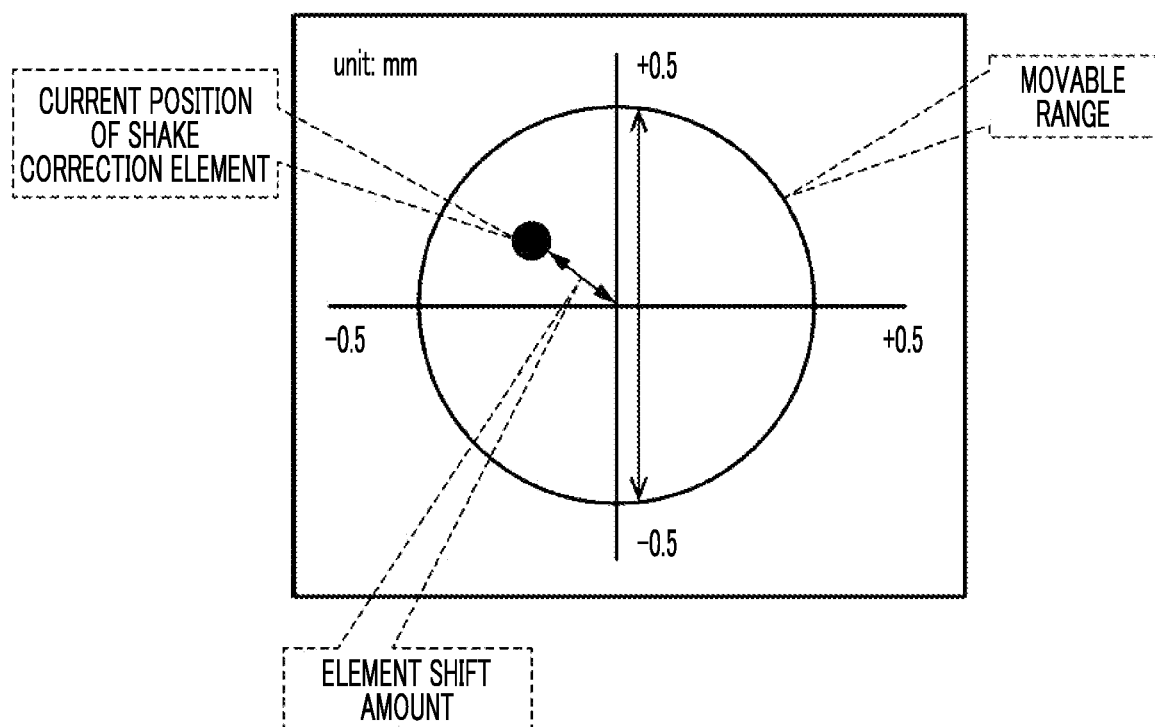
FIG. 10 is a conceptual diagram for describing the movable range of the shake correction element according to the embodiment.

In addition, the derivation portion 37B derives the second movement amount. Specifically, the second movement amount is derived by the derivation portion 37B as the movement amount required for moving the shake correction element of the shake correction portion 51 to a center position from the current position. As illustrated in FIG. 9 as an example, for a reason such as structural constraints on the surveillance camera 10, a movable range is decided for the anti-vibration lens 15B1 that is the shake correction element of the shake correction portion 51. Thus, as illustrated in FIG. 10 as an example, in a case where the anti-vibration lens 15B1 (hereinafter, referred to as the "shake correction element" without the reference numeral) is at a position shifted from the center position in the movable range, the tracking of the target subject by the shake correction portion 51 may be restricted depending on a correction amount required for correcting the shake. That is, in a case where the target subject moves in a direction outside the movable range of the shake correction element, it is difficult to track the target subject by the shake correction portion 51. Therefore, the derivation portion 37B derives the second movement amount that is the movement amount required for moving the shake correction element to the center position of the movable range (hereinafter, simply referred to as a "movable range center position").

The derivation portion 37B derives a shake correction element movement amount required for moving the shake correction element to the movable range center position from the current position based on a shake correction element shift amount and information related to the sensitivity of the shake correction portion 51 acquired by the acquisition portion 37A. The shift amount of the shake correction element is a distance between the movable range center position and the current position of the shake correction element and is acquired by the acquisition portion 37A based on information output from the position detection sensor 39.

For example, the derivation portion 37B calculates the second movement amount using Calculation Expression (2) below. A pan tilt angle φ obtained by Calculation Expression below is an example of a "second movement amount" according to the embodiment of the disclosed technology.

$$\varphi = N/k \quad (2)$$

In Calculation Expression (2), N denotes the shake correction element shift amount [mm], and k denotes the sensitivity [mm/deg].

In the present embodiment, while an example of a form of correcting the shake by moving the anti-vibration lens 15B1 is illustratively described, the disclosed technology is not limited thereto. For example, the shake may be corrected by moving the imaging element 25 in a plane parallel to the two-dimensional plane of the anti-vibration lens instead of the anti-vibration lens 15B1. In this case, the shake can be corrected within a movable range of the imaging element 25. In addition, a shift amount from a center position of the movable range of the imaging element 25 is acquired by a position detection sensor (not illustrated) of the imaging element 25. In a case of using the imaging element 25 instead of the anti-vibration lens 15B1 in correcting the shake, the imaging element 25 is an example of a "shake correction element" according to the embodiment of the disclosed technology. In this case, an imaging element moving type shake correction mechanism (not illustrated) that is an example of a "shake correction component" according to the embodiment of the disclosed technology corrects the shake by moving the imaging element in the direction perpendicular to the optical axis of the imaging optical system by applying motive power generated by a driving source such as a motor (for example, a voice coil motor) to the imaging element.

In addition, a mechanical shake correction mechanism (not illustrated) that is an example of the "shake correction component" and the "optical shake correction mechanism" according to the embodiment of the disclosed technology may correct the shake by moving both of the anti-vibration lens 15B1 and the imaging element 25 using motive power generated by a driving source such as a motor (for example, a voice coil motor). In this case, the shake can be corrected within the movable range of each of the anti-vibration lens 15B1 and the imaging element 25. In this case, the anti-vibration lens 15B1 and the imaging element 25 are an example of the "shake correction element" according to the embodiment of the disclosed technology.

Figure 11:
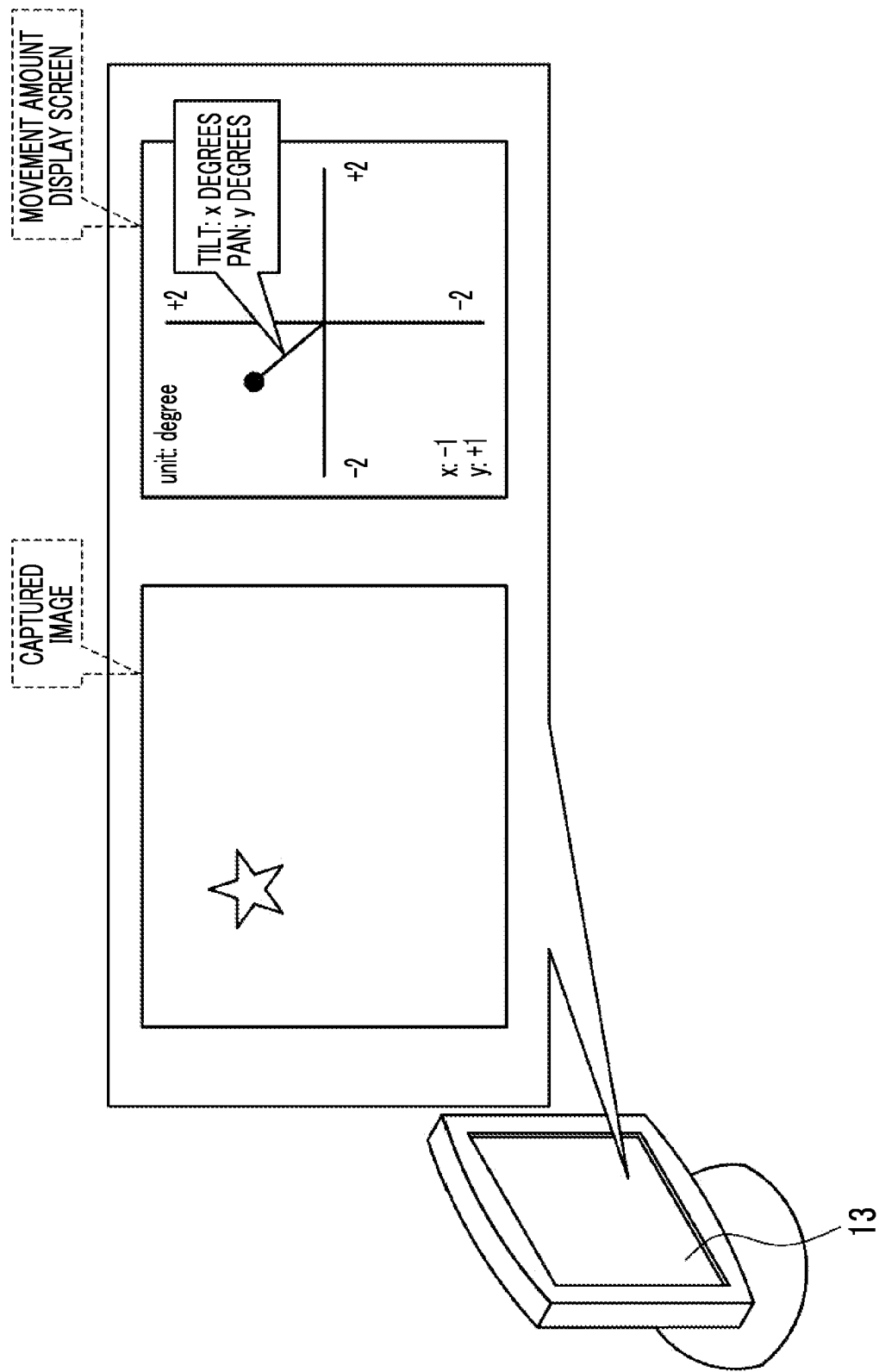
FIG. 11 is a conceptual diagram illustrating a screen display example displayed by a display portion according to the embodiment.

The derivation portion 37B derives the movement amount by combining the first movement amount and the second movement amount. The movement amount derived by the derivation portion 37B is output by the output portion 37D. As illustrated in FIG. 11 as an example, the movement amount output by the output portion 37D is displayed on the display 13 of the management apparatus 11. Specifically, on the display 13, the captured image is displayed, and the pan tilt angle is graphed and displayed at a position adjacent to the captured image on a movement amount display screen as the movement amount. The user or the like causes the surveillance camera 10 to revolve with reference to the movement amount displayed on the movement amount display screen.

In the example illustrated in FIG. 11, while a case of visibly displaying the movement amount display screen is illustrated, audible display such as output of sound by a sound reproducing device (not illustrated), permanent visible display such as output of a printed material by a printer, or tactile display by a vibrator may be performed instead of the visible display or together with the visible display.

Here, as illustrated in the upper part of FIG. 12 as an example, in an initial state of the adjustment control performed by the control portion 37C (hereinafter, simply referred to as the "initial state"), it is assumed that the position of the target subject image is shifted from the image center position. In addition, in the initial state, it is assumed that the current position of the shake correction element is shifted from the movable range center position. In this case, the movement amount derived by the derivation portion 37B is displayed on the movement amount display screen.

Figure 12:
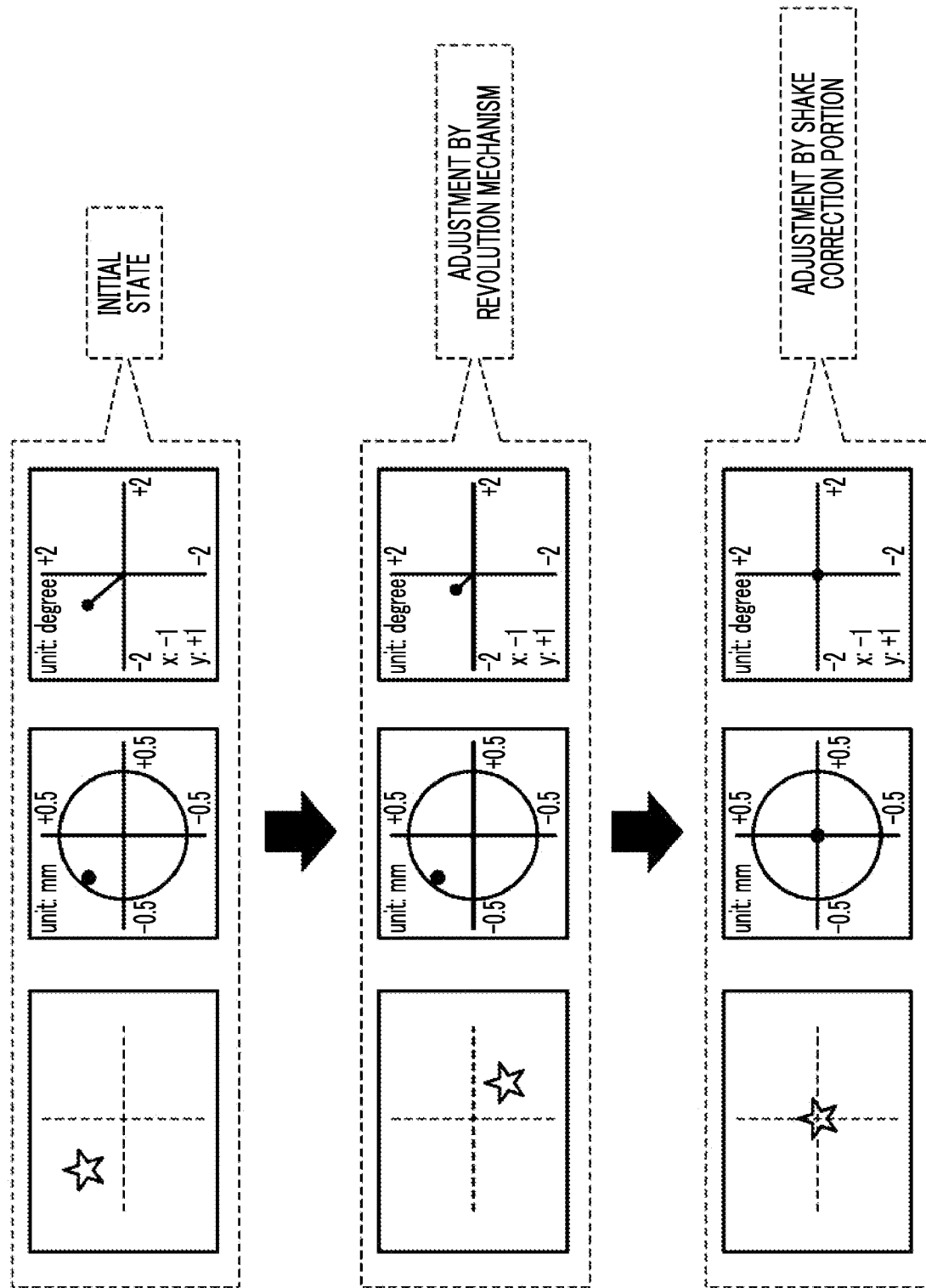
FIG. 12 is a conceptual diagram for describing position adjustment processing according to the embodiment.

The user or the like causes the surveillance camera 10 to revolve by causing the revolution mechanism 16 to perform the revolution operation based on the displayed movement amount (refer to the middle part of FIG. 12). The position of the target subject image in the captured image is adjusted by operating the revolution mechanism 16.

After the position of the target subject image is adjusted by the revolution mechanism 16 (refer to the middle part of FIG. 12), the position of the target subject image is adjusted by the shake correction portion 51 (refer to the lower part of FIG. 12). Resolution of the adjustment of the position of the target subject image by the shake correction portion 51 is higher than resolution of the adjustment of the position of the target subject image by the revolution mechanism 16. That is, in adjusting the position of the target subject image, the user or the like, first, performs coarse adjustment by the revolution mechanism 16 and then, performs fine adjustment by the shake correction portion 51. In a case where the position of the target subject image is adjusted by the shake correction portion 51, the position of the target subject image moves to the image center position. That is, an image on which the adjustment result of the position of the target subject image is reflected is displayed as the captured image. In addition, in a case where the position of the target subject image is at the image center position, the shake correction element of the shake correction portion 51 is positioned at the center of the movable range.

Figure 13:
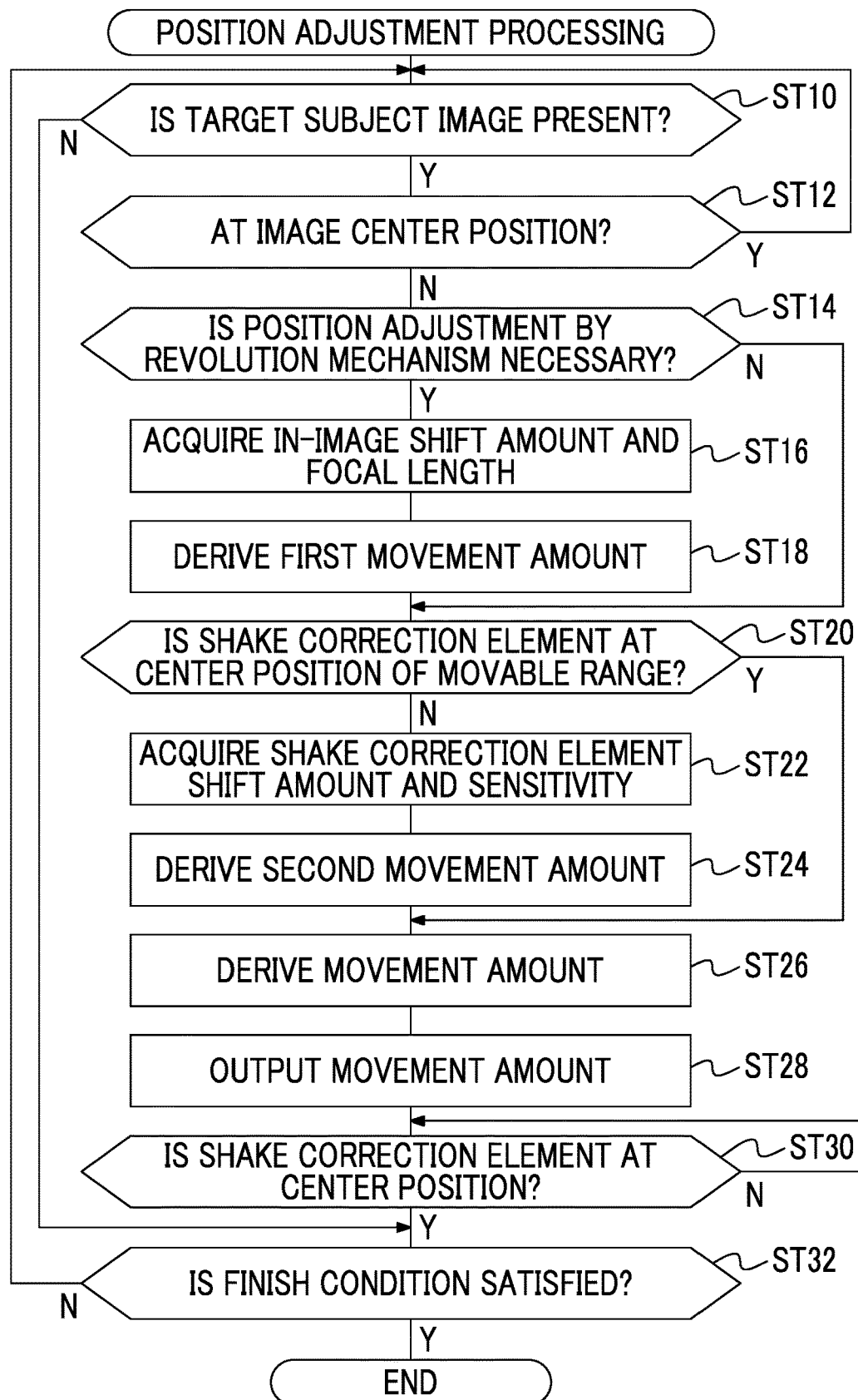
FIG. 13 is a flowchart illustrating an example of a flow of position adjustment processing according to the embodiment.

Next, actions of parts of the surveillance system 2 according to the embodiment of the disclosed technology will be described with reference to FIG. 13. FIG. 13 illustrates an example of a flow of position adjustment processing executed by the CPU 37. The flow of position adjustment processing illustrated in FIG. 13 is an example of an "imaging support method" according to the embodiment of the disclosed technology.

In the position adjustment processing illustrated in FIG. 13, first, in step ST10, the determination portion 37E determines whether or not the target subject image is included in the captured image. In step ST10, in a case where the target subject image is included in the captured image, a positive determination is made, and the position adjustment processing transitions to step ST12. In step ST10, in a case where the target subject image is not included in the captured image, a negative determination is made, and the position adjustment processing transitions to step ST32.

In step ST12, the determination portion 37E determines whether or not the position of the target subject image is at the image center position. In a case where the position of the target subject image is at the image center position, a positive determination is made, and the position adjustment processing transitions to step ST10. In step ST12, in a case where the position of the target subject image is not at the image center position, a negative determination is made, and the position adjustment processing transitions to step ST14.

In step ST14, the determination portion 37E determines whether or not position adjustment by the revolution mechanism 16 is necessary for moving the position of the target subject image to the image center position. In step ST14, in a case where the position adjustment by the revolution mechanism 16 is not necessary, a negative determination is made, and the position adjustment processing transitions to step ST20. In step ST14, in a case where the position adjustment by the revolution mechanism 16 is necessary, a positive determination is made, and the position adjustment processing transitions to ST16.

In step ST16, the acquisition portion 37A acquires the in-image shift amount, the focal length, and the pixel interval. Then, the position adjustment processing transitions to step ST18.

In step ST18, the derivation portion 37B derives the first movement amount based on the in-image shift amount, the focal length, and the pixel interval acquired in step ST18. Then, the position adjustment processing transitions to step ST20.

In step ST20, the acquisition portion 37A determines whether or not the shake correction element is at the movable range center position. In step ST20, in a case where the shake correction element is at the movable range center position, a positive determination is made, and the position adjustment processing transitions to step ST26. In step ST20, in a case where the shake correction element is not at the center position of the movable range, a negative determination is made. Then, the position adjustment processing transitions to step ST22.

In step ST22, the acquisition portion 37A acquires the shake correction element shift amount and the sensitivity. Then, the position adjustment processing transitions to step ST24.

In step ST24, the derivation portion 37B derives the second movement amount based on the shake correction element shift amount and the sensitivity. Then, the position adjustment processing transitions to step ST26.

In step ST26, the derivation portion 37B derives the movement amount based on the first movement amount and the second movement amount. Then, the position adjustment processing transitions to step ST28.

In step ST28, the output portion 37D outputs the movement amount. Then, the position adjustment processing transitions to step ST30.

In step ST30, the determination portion 37E determines whether or not the shake correction element is at the center position of the movable range. In step ST30, in a case where the shake correction element is not at the center position of the movable range, a negative determination is made. Then, the position adjustment processing transitions to step ST30. In step ST30, in a case where the shake correction element is at the movable range center position, a positive determination is made, and the position adjustment processing transitions to step ST32.

In step ST32, the determination portion 37E determines whether or not a condition (hereinafter, referred to as a "position adjustment processing finish condition") under which the position adjustment processing is finished is satisfied. Examples of the position adjustment processing finish condition include a condition that an instruction to finish the position adjustment processing is received by the reception device 62. In step ST32, in a case where the position adjustment processing finish condition is not satisfied, a negative determination is made, and the position adjustment processing transitions to step ST10. In step ST32, in a case where the position adjustment processing finish condition is satisfied, a positive determination is made, and the position adjustment processing is finished.

As described above, in the surveillance camera 10, the target subject may be tracked in capturing of the imaging region including the target subject. In this case, the position of the target subject image in the captured image may be required to be set to the specific position in order to deal with the movement of the target subject.

Therefore, in the surveillance camera 10, the movement amount required for moving the position of the target subject image in the captured image to the specific position by the position adjustment portion 52 is derived based on the in-image shift amount, the focal length, and the information related to the pixel interval. In addition, in the surveillance camera 10, the derived movement amount is output. Accordingly, in the surveillance camera 10, tracking of the target subject in a case of capturing the imaging region including the target subject can be supported.

In addition, in the surveillance camera 10, the revolution mechanism 16 and the shake correction portion 51 are used as the position adjustment portion 52. Accordingly, by using the already provided revolution mechanism and the shake correction portion 51 as the position adjustment portion 52, a configuration is simplified compared to a case of separately providing the position adjustment portion 52.

In addition, in the surveillance camera 10, the movement amount is decided based on the first movement amount required for adjusting the position of the target subject image by the revolution mechanism 16 and the second movement amount required for adjusting the position of the target subject image by the shake correction portion 51. Accordingly, the movement amount appropriate for each of the revolution mechanism 16 and the shake correction portion 51 is set compared to a case where the movement amounts of the revolution mechanism 16 and the shake correction portion 51 are predetermined values.

In addition, in the surveillance camera 10, the shake correction portion 51 includes the shake correction element that is at least one of the anti-vibration lens 15B1 or the imaging element 25. In a case where the position of the target subject image is at the specific position, the shake correction element is positioned at the center of the movable range of the shake correction element. Accordingly, a wide trackable range of the target subject image can be secured compared to a case where the shake correction element is at a location other than the center after the position of the target subject image is set to the specific position.

In addition, in the surveillance camera 10, the sensitivity of the shake correction portion 51 is acquired, and the movement amount required for moving the current position of the shake correction element to the center position of the movable range is derived as the second movement amount based on the shift amount of the shake correction element and the sensitivity. Accordingly, since the movement amount of the target subject image is decided based on the shake correction element shift amount and the sensitivity, the movement amount of the target subject image is accurately obtained compared to a case where the movement amount of the position of the target subject image for the shake correction portion 51 is an invariable value.

In addition, in the surveillance camera 10, the first movement amount is decided as a value obtained by dividing the product of the in-image shift amount and the pixel interval by the focal length. Accordingly, since the movement amount of the target subject image is decided based on the in-image shift amount, the pixel interval, and the focal length, the movement amount of the target subject image is accurately obtained compared to a case where the movement amount of the position of the target subject image for the revolution mechanism 16 is an invariable value.

In addition, in the surveillance camera 10, the movement amount is decided by combining the first movement amount and the second movement amount. Accordingly, since the movement amount is derived as a value obtained by combining the first movement amount and the second movement amount, subsequent processing such as display on the display portion is facilitated compared to a case of separately deriving the first movement amount and the second movement amount.

In addition, in the surveillance camera 10, the shake correction by the shake correction portion 51 and the adjustment control are performed in a time-division manner. Accordingly, an effect of one of the correction of the shake by the shake correction portion 51 and the adjustment control on the other can be suppressed compared to a case where the correction of the shake by the shake correction portion 51 and the adjustment control are performed in parallel.

In addition, in the surveillance camera 10, the correction of the shake by the shake correction portion 51 is performed while the revolution by the revolution mechanism 16 is performed, and the adjustment control is performed while the revolution by the revolution mechanism 16 is stopped. Accordingly, both of accuracy of the correction of the shake by the shake correction portion 51 and accuracy of the adjustment control can be increased compared to a case where the correction of the shake by the shake correction portion 51 and the adjustment control are performed in parallel while the surveillance camera 10 is revolving and while the revolution of the surveillance camera 10 by the revolution mechanism 16 is stopped.

In addition, in the surveillance camera 10, after the position of the target subject image is adjusted by the revolution mechanism 16, the position of the target subject image is adjusted within a narrower range by the shake correction portion 51. Accordingly, accuracy of the adjustment of the position of the target subject image is improved compared to a case of adjusting the position of the target subject image by only the revolution mechanism.

In addition, in the surveillance camera 10, the revolution mechanism 16 is a 2-axis revolution mechanism, and the shake correction portion 51 is at least one of an optical shake correction mechanism or an electronic shake correction portion. Accordingly, by combining the 2-axis revolution mechanism and at least one of the optical shake correction mechanism or the electronic shake correction portion, the movement amount required for adjusting the position of the target subject image can be secured for each direction of two axes.

In addition, in the surveillance camera 10, the optical shake correction mechanism is at least one of a lens moving type shake correction mechanism or an imaging element moving type shake correction mechanism. Accordingly, by at least one of the lens moving type shake correction mechanism or the imaging element moving type shake correction mechanism, the movement amount required for adjusting the position of the target subject image can be secured for each direction of two axes.

In addition, in the surveillance camera 10, the information related to the pixel interval of the pixels of the imaging element 25 is acquired by the acquisition portion 37A. Accordingly, even in a case where the information related to the pixel interval is updated, the movement amount required for moving the position of the target subject image to the specific position can be derived using the most recent information related to the pixel interval.

In addition, in the surveillance camera 10, the derived movement amount is output to the outside. Accordingly, the user or the like can perceive the movement amount required for moving the position of the target subject image to the specific position.

Figure 14:
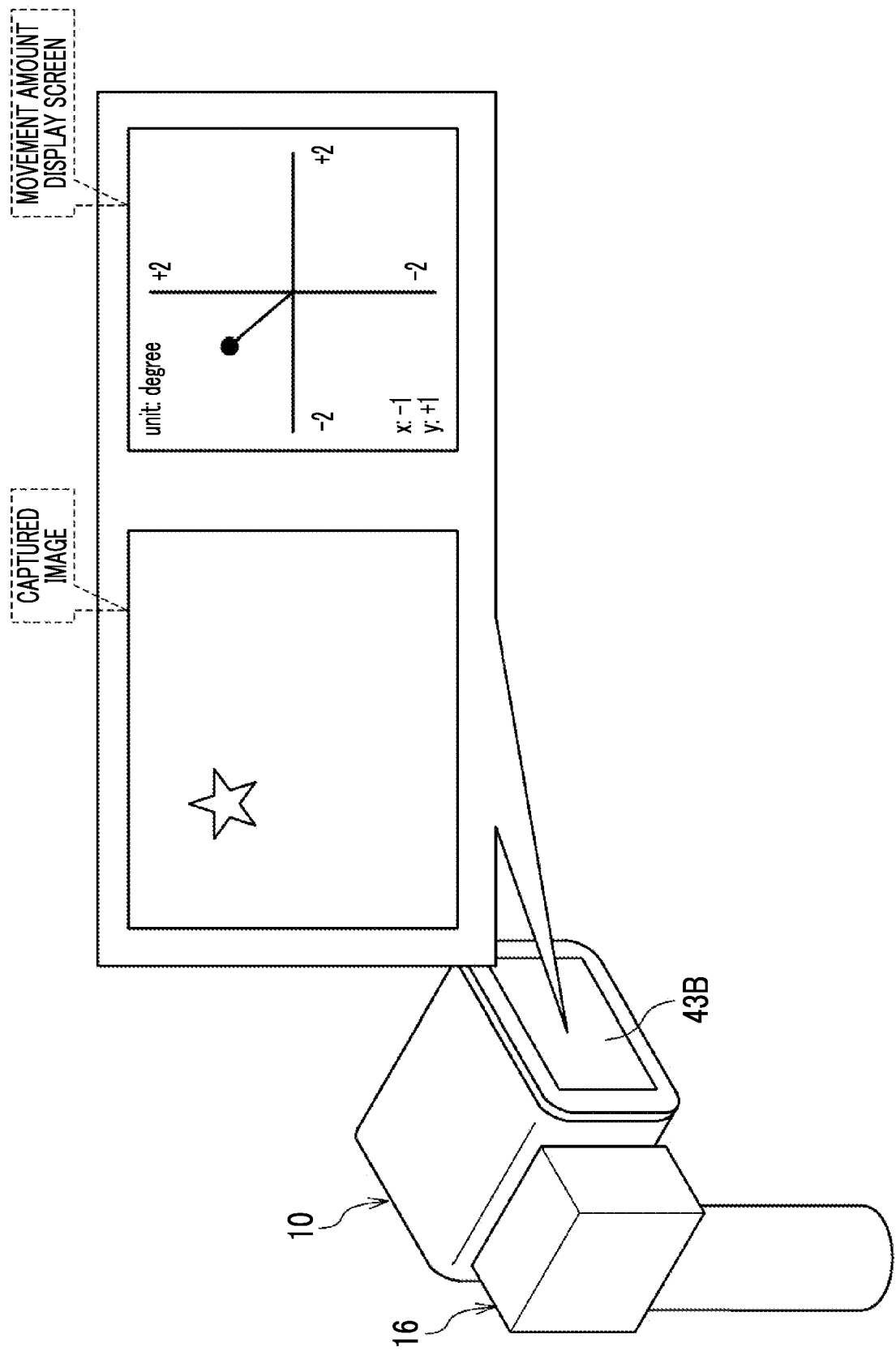
FIG. 14 is a conceptual diagram illustrating an example of a display portion of the surveillance camera according to the embodiment.

In the embodiment, while an example in which the movement amount output to the outside is displayed on the display 13 of the management apparatus 11 is illustrated, the disclosed technology is not limited thereto. As illustrated in FIG. 14 as an example, the movement amount output from the output portion 37D may be displayed on the display 43B provided in the surveillance camera 10. The display 43B is an example of the "outside" according to the embodiment of the disclosed technology.

Figure 15:
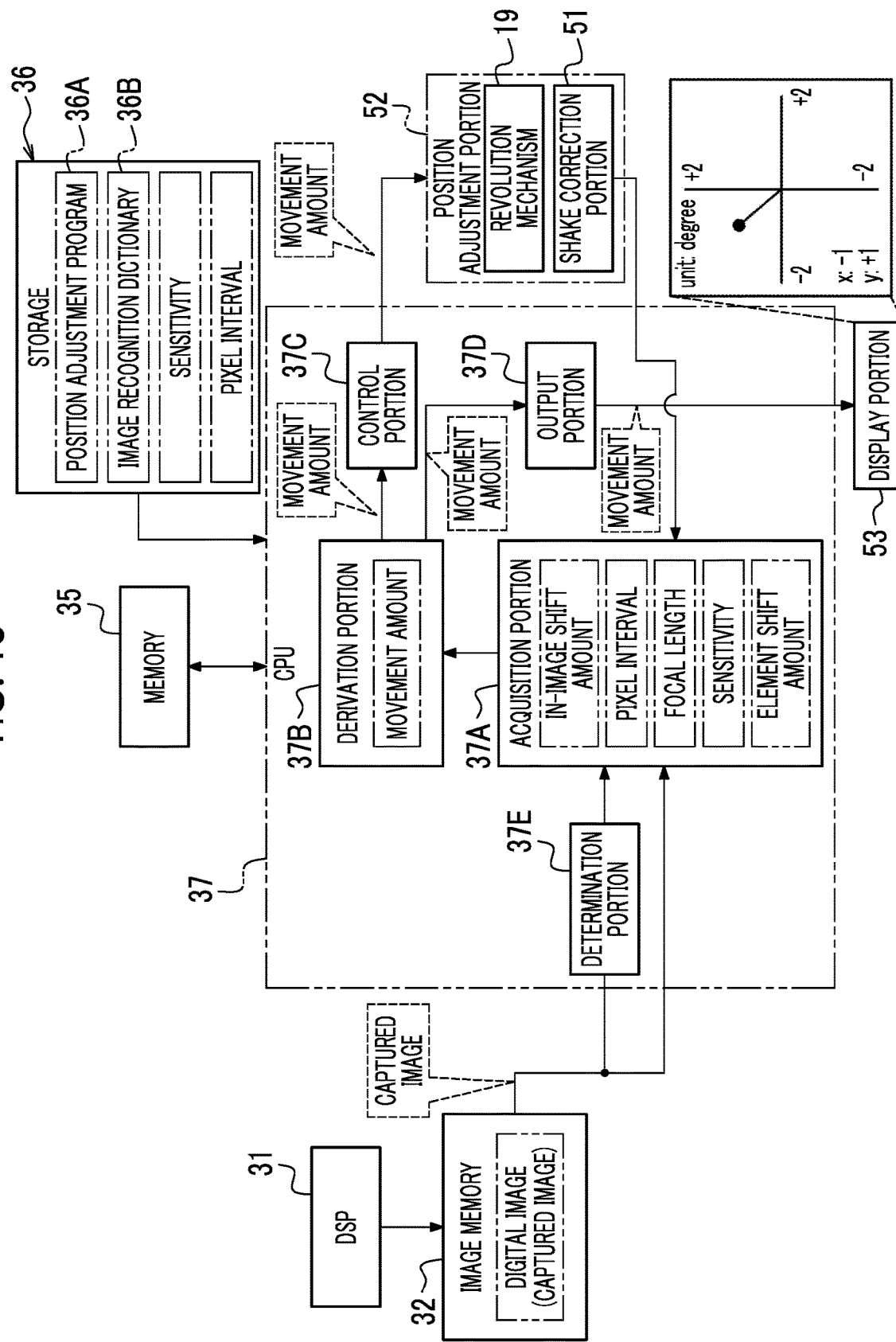
FIG. 15 is a function block diagram illustrating a modification example of the functions of the CPU included in the surveillance camera according to the embodiment.

Specifically, as illustrated in FIG. 15 as an example, the movement amount derived by the derivation portion 37B is output from the output portion 37D. The output portion 37D outputs the movement amount to a display portion 53. Examples of the display portion 53 include the display 13 and/or the display 43B. Accordingly, the user or the like of the surveillance camera 10 can perceive the movement amount required for moving the position of the target subject image to the image center position.

In the example illustrated in FIG. 14, while a case of visibly displaying the movement amount display screen is illustrated, audible display such as output of sound by a sound reproducing device (not illustrated), permanent visible display such as output of a printed material by a printer, or tactile display by a vibrator may be performed instead of the visible display or together with the visible display.

Figure 16:
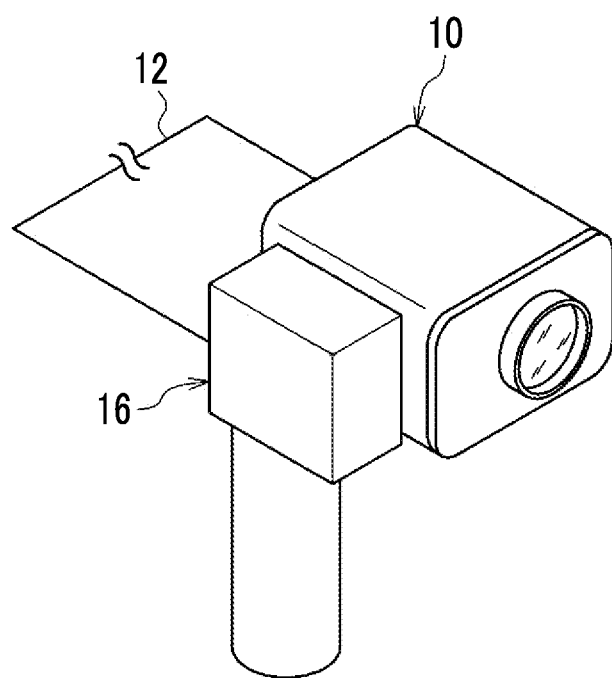
FIG. 16 is a schematic configuration diagram illustrating an example of a configuration of the surveillance camera according to the embodiment.

In addition, in the embodiment, while an example in which the revolution by the revolution mechanism 16 is performed by the user or the like of the surveillance camera 10 is illustrated, the disclosed technology is not limited thereto. As illustrated in FIG. 16 as an example, the surveillance camera 10 and the revolution mechanism 16 may be communicably connected through the communication line 12. In the example of the present form, the movement amount required for moving the position of the target subject image to the image center position is output from the control portion 37C in the surveillance camera 10 to the revolution mechanism 16. The revolution mechanism 16 causes the surveillance camera 10 to revolve by the movement amount input from the control portion 37C.

Second Embodiment

In the first embodiment, a case where the target subject does not move is described. In a second embodiment, a case where the target subject moves will be described. In the second embodiment, the same constituents as in the first embodiment will be designated by the same reference numerals and will not be described. Hereinafter, parts different from the first embodiment will be described.

Figure 17:
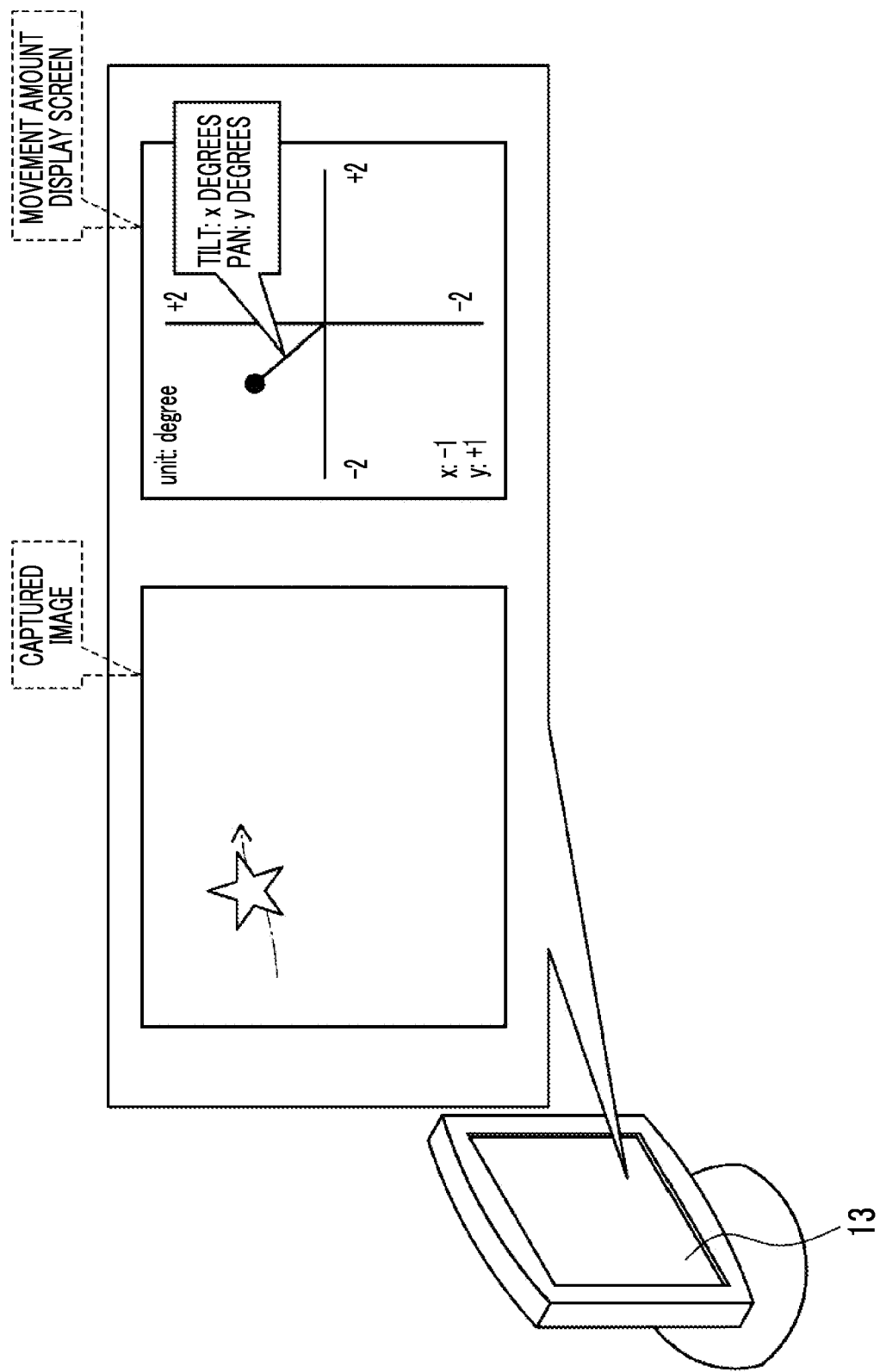
FIG. 17 is a conceptual diagram illustrating a screen display example displayed by the display portion according to the embodiment.

In imaging in the surveillance camera 10 according to the second embodiment, as illustrated in FIG. 17 as an example, the position of the target subject image in the captured image changes over time by the movement of the target subject. That is, the in-image shift amount between the image center position and the position of the target subject image changes. Thus, the movement amount required for moving the position of the target subject image to the image center position also needs to be obtained as a movement amount in which the movement of the target subject is considered.

Figure 18:
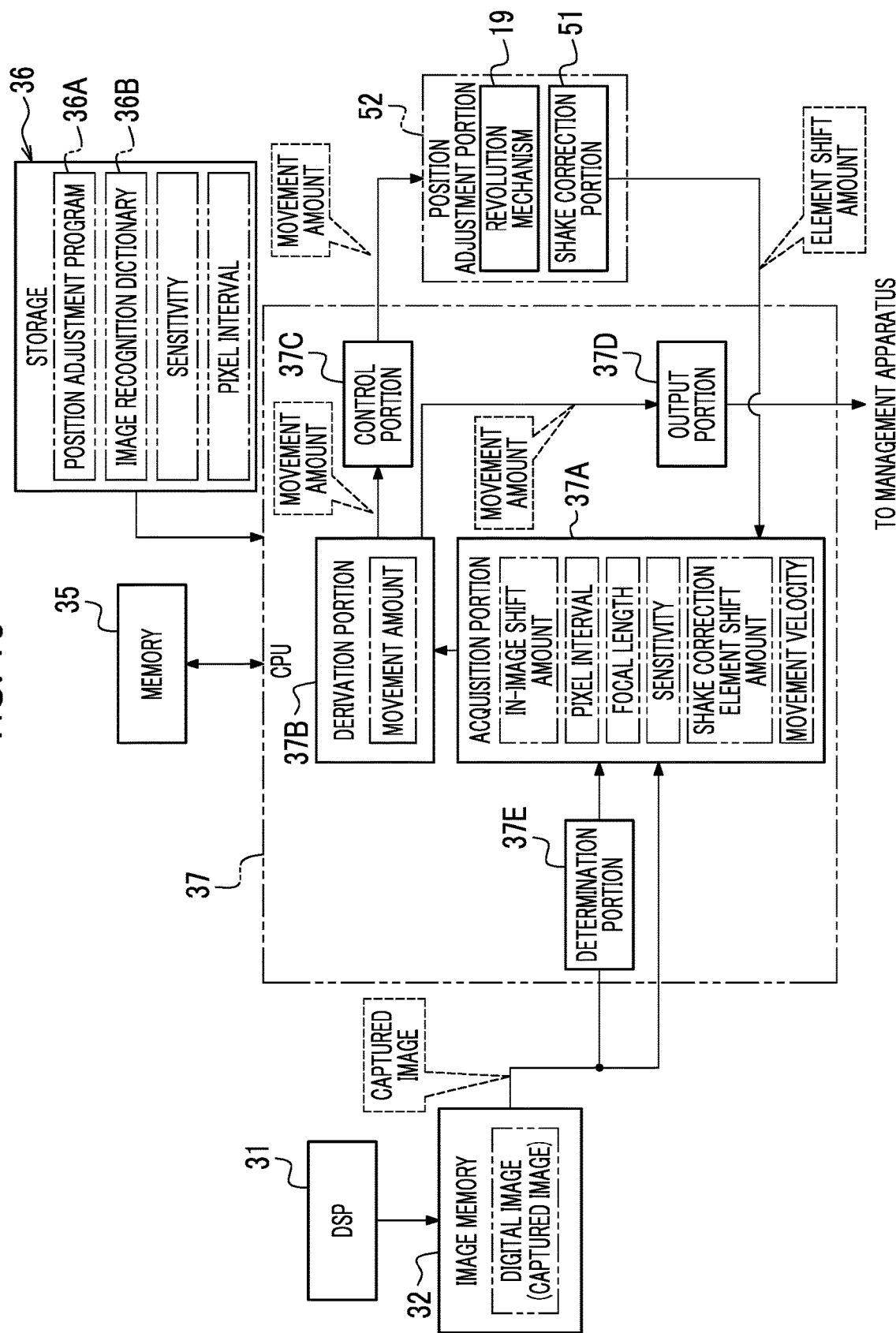
FIG. 18 is a function block diagram illustrating a modification example of the functions of the CPU included in the surveillance camera according to the embodiment.

Specifically, as illustrated in FIG. 18 as an example, the determination portion 37E determines whether or not the position of the target subject image is changing in the captured image. The acquisition portion 37A acquires a movement velocity of the target subject image by calculating a movement amount per unit time for the target subject image between the frames of the captured image stored in the image memory 32. In a case where the position of the target subject image is changing in the captured image, the derivation portion 37B derives the movement amount required for setting the position of the target subject image to the image center position based on the movement velocity.

The determination portion 37E decomposes the movement velocity of the target subject image into a plurality of velocities in a vertical direction and a horizontal direction in the captured image. The vertical direction and the horizontal direction in the captured image are an example of a "plurality of different directions" according to the embodiment of the disclosed technology. For the movement velocities obtained by decomposing the movement velocity of the target subject image into a component of the vertical direction and a component of the horizontal direction of the captured image, the determination portion 37E obtains a speed of the component of each direction. Furthermore, the determination portion 37E compares the speeds of the component of the horizontal direction and the component of the vertical direction of the captured image. In addition, the determination portion 37E determines whether or not a component of a direction of a higher speed heads toward the image center position side. The derivation portion 37B determines whether or not to output the derived movement amount based on the determination result as to whether or not the component of the direction of the higher speed is a direction of heading toward the image center position side.

Figure 19:
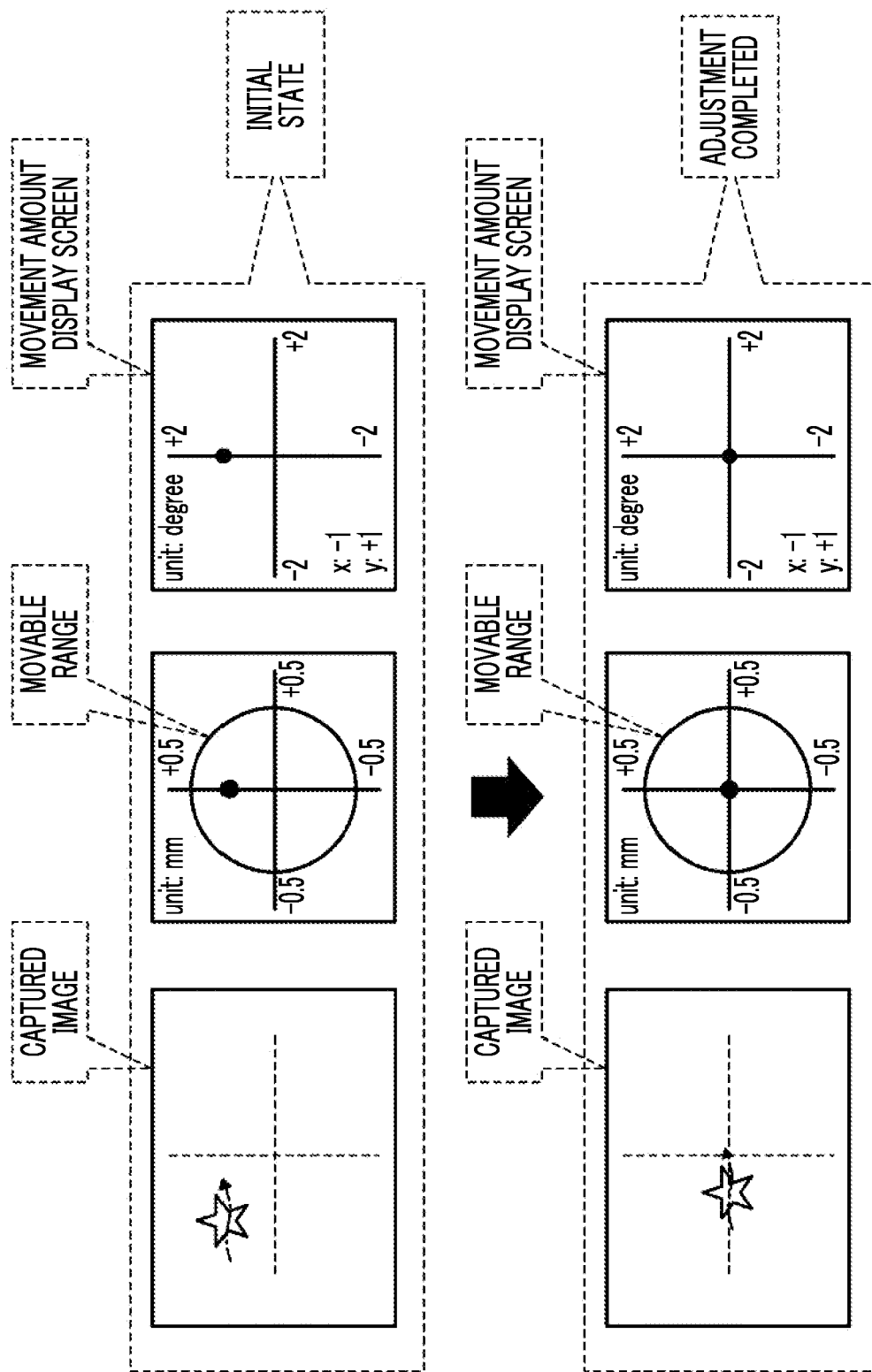
FIG. 19 is a conceptual diagram for describing the position adjustment processing according to the embodiment.

As illustrated in FIG. 19 as an example, in a case where the position of the target subject image is changing in a rightward direction of heading toward the image center position side in the captured image, the speed of the component of the horizontal direction is greater than the component of the vertical direction of the captured image. The component having the higher speed (in the example illustrated in FIG. 19, the component of the horizontal direction of the captured image) is a component of the direction of heading toward the image center position side. Consequently, the derivation portion 37B does not output the movement amount in the horizontal direction (pan direction) of the captured image. Accordingly, in the initial state, the movement amount in only the vertical direction (tilt direction) of the captured image is displayed on the movement amount display screen (refer to the upper part of FIG. 19). After position adjustment by the position adjustment portion 52 is completed, the position of the target subject image in the captured image changes in a direction of approaching the image center position (refer to the lower part of FIG. 19).

Figure 20:
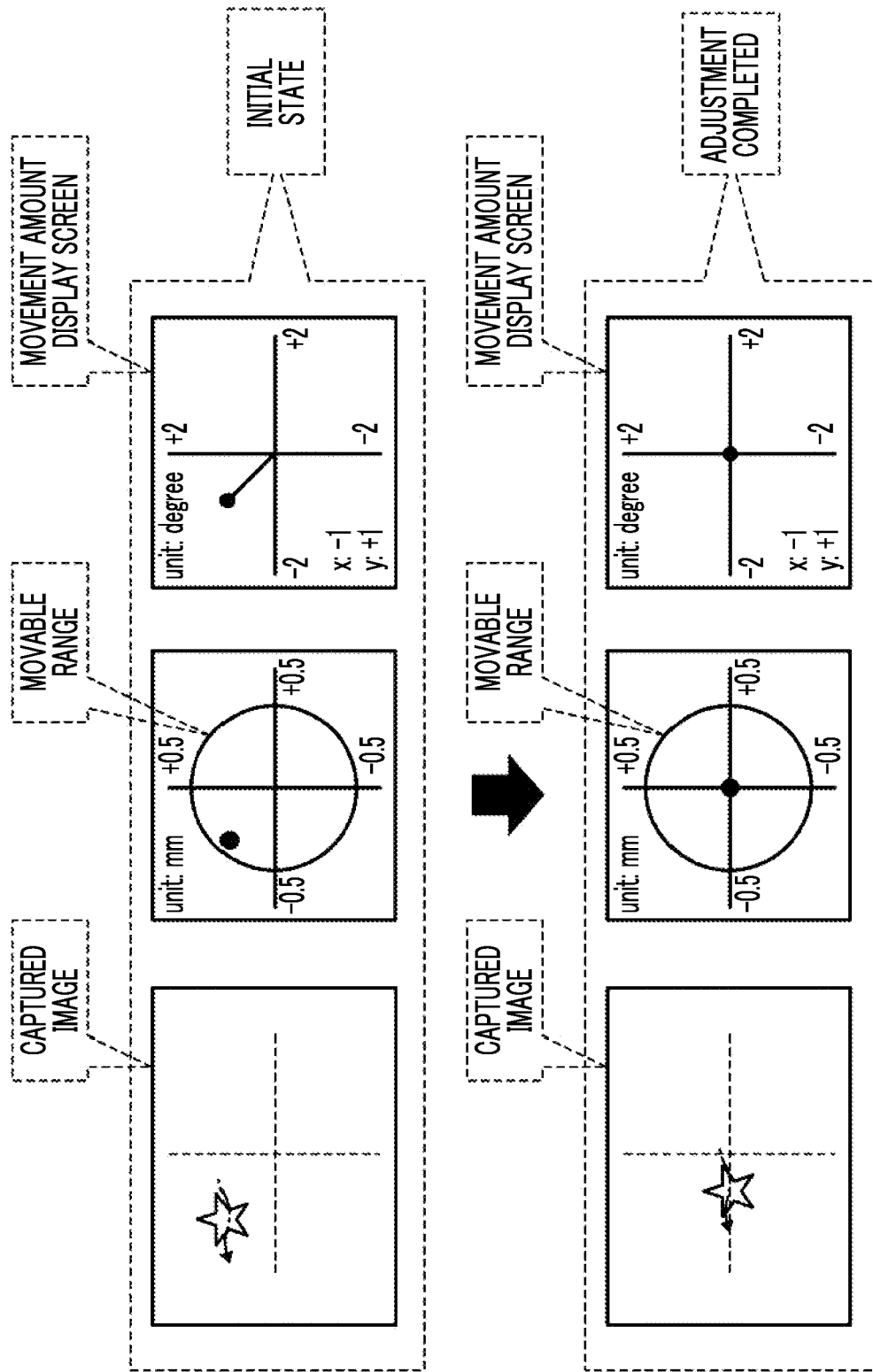
FIG. 20 is a conceptual diagram for describing the position adjustment processing according to the embodiment.

Meanwhile, as illustrated in FIG. 20, in a case where the position of the target subject image is changing in a leftward direction of separating from the image center position in the captured image, the component having the higher speed is a direction of separating from the image center position. In this case, the derivation portion 37B outputs the movement amounts in the horizontal direction (pan direction) and also the vertical direction (tilt direction) of the captured image. Accordingly, in the initial state, the movement amounts (pan tilt angles) in the horizontal direction (pan direction) and the vertical direction (tilt direction) of the captured image are displayed on the movement amount display screen (refer to the upper part of FIG. 20). After the position adjustment by the position adjustment portion 52 is completed, the position of the target subject image in the captured image is at the specific position (refer to the lower part of FIG. 20).

Figure 21A:
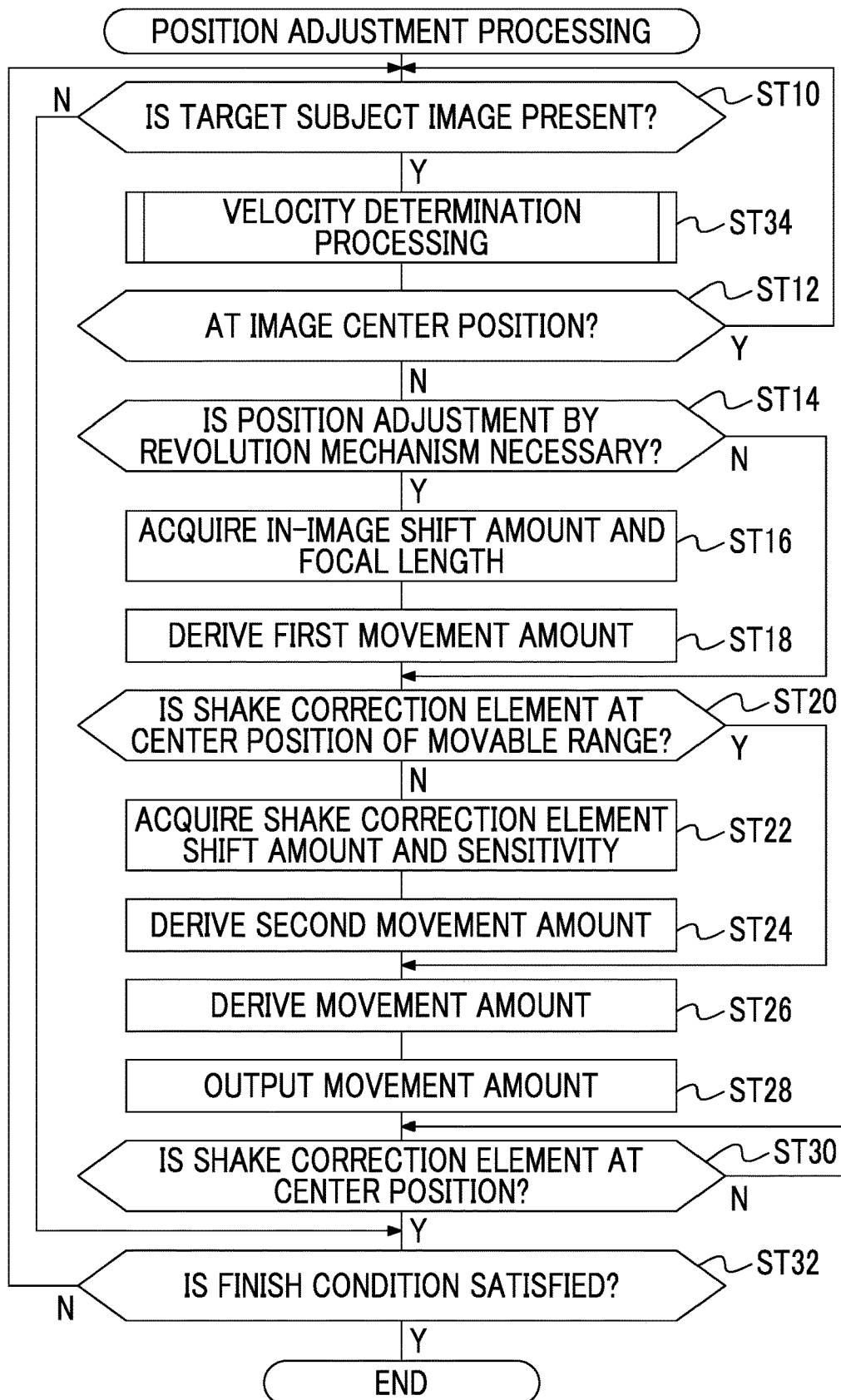
FIG. 21A is a flowchart illustrating an example of the flow of position adjustment processing according to the embodiment.
Figure 21B:
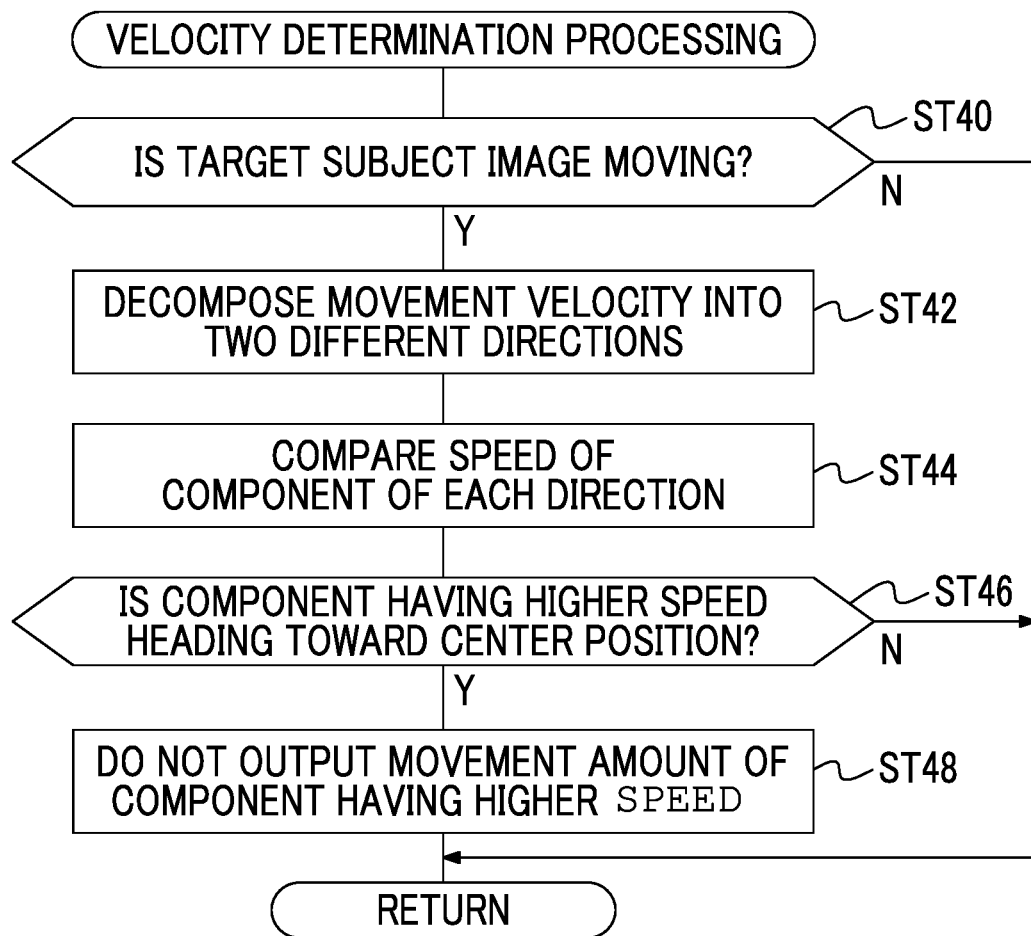
FIG. 21B is a flowchart illustrating an example of a flow of velocity determination processing according to the embodiment.

Next, actions of parts of the surveillance system 2 according to the embodiment of the disclosed technology will be described with reference to FIG. 21A and FIG. 21B. FIG. 21A and FIG. 21B illustrate an example of the flow of position adjustment processing executed by the CPU 37. The flow of position adjustment processing illustrated in FIG. 21A and FIG. 21B is an example of the "imaging support method" according to the embodiment of the disclosed technology.

In the position adjustment processing illustrated in FIG. 21A, first, in step ST10, the determination portion 37E determines whether or not the target subject image is included in the captured image. In step ST10, in a case where the target subject image is included in the captured image, a positive determination is made, and the position adjustment processing transitions to step ST34. In step ST10, in a case where the target subject image is not included in the captured image, a negative determination is made, and the position adjustment processing transitions to step ST32.

In step ST34, the determination portion 37E executes velocity determination processing illustrated in FIG. 21B as an example. In the velocity determination processing illustrated in FIG. 21B, first, in step ST40, the determination portion 37E determines whether or not the position of the target subject image is moving in the captured image. In step ST40, in a case where the position of the target subject image is moving, a positive determination is made, and the velocity determination processing transitions to step ST42. In the determination in step ST40, in a case where the position of the target subject image is not moving, a negative determination is made, and the velocity determination processing transitions to step ST14 of the position adjustment processing illustrated in FIG. 21A.

In step ST42, the movement velocity of the target subject is decomposed into two different directions by the determination portion 37E. Then, the velocity determination processing transitions to step ST44.

In step ST44, the determination portion 37E compares the speed of the component of each direction decomposed in step ST42. Then, the velocity determination processing transitions to step ST46.

In step ST46, the determination portion 37E determines whether or not the component having the higher speed out of the directions compared in step ST44 is the direction of heading toward the image center position. In step ST46, in a case where the component having the higher speed is the direction of heading toward the image center position, a positive determination is made, and the velocity determination processing transitions to step ST48. In step ST46, in a case where the component having the higher speed is not the direction of heading toward the image center position, a negative determination is made, and the velocity determination processing transitions to step ST14 of the position adjustment processing illustrated in FIG. 21A.

In step ST48, the derivation portion 37B controls the output portion 37D such that the movement amount of the component having the higher speed is not output. Then, the velocity determination processing transitions to step ST12 of the position adjustment processing illustrated in FIG. 21A.

As described above, in the surveillance camera 10 according to the second embodiment, even while the target subject is moving, the position adjustment in which the movement velocity of the moving target subject is considered can be performed.

In addition, in the surveillance camera 10 according to the second embodiment, even while the target subject is moving, high-accuracy position adjustment can be implemented compared to a case where the movement velocity is a velocity in only a single direction.

In each of the embodiments, while an example of a form in which the movement amount obtained by combining the first movement amount and the second movement amount is displayed on the display 13 is illustratively described, the disclosed technology is not limited thereto. For example, the first movement amount and the second movement amount may be displayed by separate indicators.

In addition, in each of the embodiments, while an example in which the specific position and the predetermined position are the image center position is illustratively described, the disclosed technology is not limited thereto. The specific position and the predetermined position may be set to any position (for example, one of four corners in the captured image) in the captured image by the user or the like.

In addition, in each of the embodiments, while a device including an ASIC and an FPGA is illustrated, the disclosed technology is not limited thereto. Various processing may be implemented by a software configuration using a computer.

Figure 22:
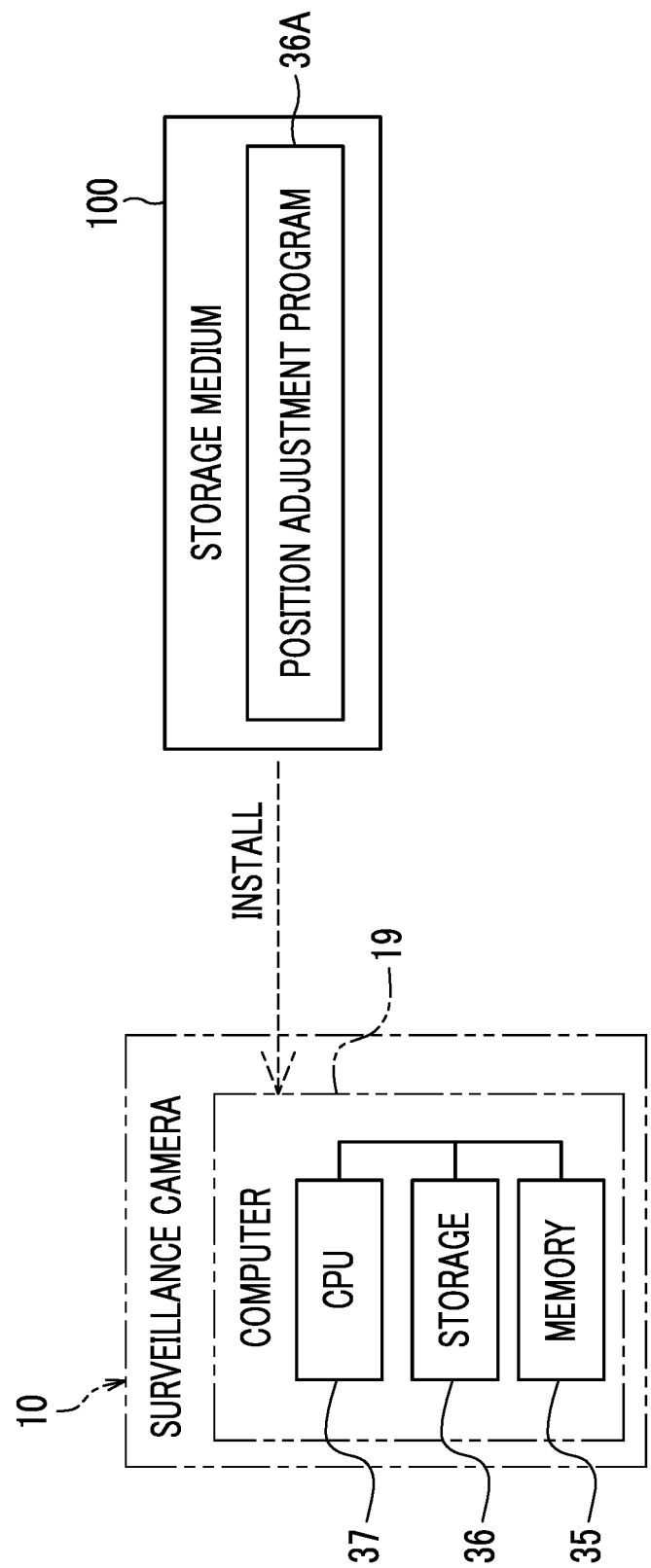
FIG. 22 is a conceptual diagram illustrating an example of an aspect in which a position adjustment program is installed on a computer in the surveillance camera from a storage medium storing the position adjustment program according to the embodiment.

In this case, for example, as illustrated in FIG. 22, the computer 19 is incorporated in the surveillance camera 10. The position adjustment program 36A causing the computer 19 to execute the position adjustment processing according to the embodiments is stored in a storage medium 100 that is a non-transitory storage medium. Examples of the storage medium 100 include any portable storage medium such as an SSD or a USB memory.

The computer 19 comprises the CPU 37, the storage 36, and the memory 35. The storage 36 is a non-volatile storage device such as an EEPROM, and the memory 35 is a volatile storage device such as a RAM. The position adjustment program 36A stored in the storage medium 100 is installed on the computer 19. The CPU 37 executes the position adjustment processing in accordance with the position adjustment program 36A.

The position adjustment program 36A may be stored in the storage 36 instead of the storage medium 100. In this case, the CPU 37 reads out the position adjustment program 36A from the storage 36 and executes the read position adjustment program 36A on the memory 35. In such a manner, the position adjustment processing is implemented by executing the position adjustment program 36A by the CPU 37.

In addition, the position adjustment program 36A may be stored in a storage portion of another computer, a server apparatus, or the like connected to the computer 19 through a communication network (not illustrated), and the position adjustment program 36A may be downloaded and installed on the computer 19 in response to a request of the surveillance camera 10.

In the storage portion of the other computer, the server apparatus, or the like connected to the computer 19 or in the storage 36, the entire position adjustment program 36A does not need to be stored, and a part of the position adjustment program 36A may be stored.

In the example illustrated in FIG. 22, while an example of an aspect of incorporating the computer 19 in the surveillance camera 10 is illustrated, the disclosed technology is not limited thereto. For example, the computer 19 may be provided outside the surveillance camera 10.

In the example illustrated in FIG. 22, while the CPU 37 is a single CPU, the CPU 37 may include a plurality of CPUs. In addition, a GPU may be applied instead of the CPU 37.

In the example illustrated in FIG. 22, while the computer 19 is illustrated, the disclosed technology is not limited thereto. A device including an ASIC, an FPGA, and/or a PLD may be applied instead of the computer 19. In addition, a combination of a hardware configuration and a software configuration may be used instead of the computer 19.

Various processors illustrated below can be used as a hardware resource for executing the position adjustment processing described in each of the embodiments. Examples of the processors include a CPU that is a general-purpose processor functioning as the hardware resource for executing the position adjustment processing by executing software, that is, the program. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the position adjustment processing using the memory.

The hardware resource for executing the position adjustment processing may be configured with one of those various processors or may be configured with a combination of two or more processors of the same type or different types (for example, a combination of a plurality of FPGAs or a combination of a CPU and an FPGA). In addition, the hardware resource for executing the position adjustment processing may be one processor.

Examples of a configuration with one processor include, first, a form in which one processor is configured with a combination of one or more CPUs and software, and the processor functions as the hardware resource for executing the position adjustment processing. Second, as represented by an SoC or the like, a form of using a processor that implements, by one IC chip, functions of the entire system including a plurality of hardware resources for executing the position adjustment processing is included. In such a manner, the position adjustment processing is implemented using one or more of the various processors as the hardware resource.

Furthermore, more specifically, an electric circuit in which circuit elements such as semiconductor elements are combined can be used as a hardware structure of those various processors. In addition, the position adjustment processing is merely an example. Accordingly, unnecessary steps may be deleted, new steps may be added, or a processing order may be rearranged without departing from the gist of the disclosed technology.

In addition, while the surveillance camera 10 is illustrated in the example illustrated in FIG. 1, the disclosed technology is not limited thereto. That is, the disclosed technology can be applied to various electronic apparatuses (for example, a lens-interchangeable camera, a fixed lens camera, a smart device, a personal computer, and/or a wearable terminal apparatus or the like) incorporating the imaging apparatus. Even with these electronic apparatuses, the same actions and effects as the surveillance camera 10 are obtained.

In addition, while the display 43B is illustrated in each of the embodiments, the disclosed technology is not limited thereto. For example, a separate display that is connected to the imaging apparatus may be used as the "display portion" according to the embodiment of the disclosed technology.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendix is further disclosed with respect to the embodiments.

(Appendix)

An information processing apparatus including a processor, and a memory that is incorporated in or connected to the processor, in which the processor is configured to acquire an in-image shift amount between a predetermined position in a captured image obtained by capturing an imaging region including a target subject by an imaging element and a position of a target subject image showing the target subject, and a focal length of an imaging apparatus, derive a movement amount required for moving the position of the target subject image to a specific position by a position adjustment portion which adjusts the position of the target subject image in the captured image, based on the in-image shift amount acquired by the acquisition portion, the focal length acquired by the acquisition portion, and information related to a pixel interval of pixels in the imaging element, and output the movement amount derived by the derivation portion.

What is claimed is:

1. An imaging support device supporting imaging performed by an
   imaging apparatus including an imaging element, the imaging support device comprising:
   a processor; and
   a memory that is incorporated in or coupled to the processor,
   wherein the processor is configured to move a position of a target subject image showing a target subject to a specific position by means of a revolution mechanism that causes the imaging apparatus to revolve and a shake correction component that corrects a shake that occurs as a result of a vibration imparted to the imaging apparatus, and
   wherein a resolution for adjusting the position of the target subject image by means of the shake correction component is higher than a resolution for adjusting the position of the target subject image by means of the revolution mechanism.

2. The imaging support device according to claim 1, wherein the shake correction component includes at least one of an optical shake correction mechanism or an electronic shake correction component.

3. The imaging support device according to claim 1, wherein a first movement amount required for adjusting the position of the target subject image by means of the revolution mechanism is larger than a second movement amount required for adjusting the position of the target subject image by means of the shake correction component.

4. The imaging support device according to claim 1, wherein the processor is configured to perform adjustment control for adjusting the position of the target subject image in a captured image by operating at least one of the revolution mechanism or the shake correction component based on a movement amount required for moving the position of the target subject image to the specific position by means of the at least one of the revolution mechanism or the shake correction component.

5. The imaging support device according to claim 4, wherein the movement amount is decided based on a first movement amount required for adjusting the position of the target subject image by means of the revolution mechanism and a second movement amount required for adjusting the position of the target subject image by means of the shake correction component.

6. The imaging support device according to claim 1, wherein:
   the shake correction component includes a shake correction element that is at least one of a lens for correcting the shake by moving in accordance with the vibration, or the imaging element, and
   at the specific position, the shake correction element is positioned at a center of a movable range of the shake correction element.

7. The imaging support device according to claim 6, wherein the processor is configured to:
   acquire a sensitivity of the shake correction component, and
   derive, based on a shake correction element shift amount between a center position of the movable range and a current position of the shake correction element, and the acquired sensitivity, a shake correction element movement amount required for moving the current position to the center position as a movement amount required for adjusting the position of the target subject image by means of the shake correction component.

8. The imaging support device according to claim 1, wherein a movement amount for adjusting the position of the target subject image to the specific position by means of the revolution mechanism and the shake correction component is obtained by combining a first movement amount required for adjusting the position of the target subject image by means of the revolution mechanism and a second movement amount required for adjusting the position of the target subject image by means of the shake correction component.

9. The imaging support device according to claim 1, wherein the processor is configured to perform correction of the shake by means of the shake correction component and adjustment control for adjusting the position of the target subject image in a captured image by operating at least one of the revolution mechanism or the shake correction component based on a movement amount required for moving the position of the target subject image to the specific position by means of the at least one of the revolution mechanism or the shake correction component, in accordance with a time division.

10. The imaging support device according to claim 9, wherein the processor is configured to cause the shake correction component to perform the correction of the shake while the imaging apparatus is being revolved by the revolution mechanism, and to perform the adjustment control while revolution of the imaging apparatus by the revolution mechanism is stopped.

11. The imaging support device according to claim 9, wherein the adjustment control comprises control for adjusting the position of the target subject image by means of the shake correction component after the position of the target subject image is adjusted by the revolution mechanism.

12. The imaging support device according to claim 1, wherein:
   the revolution mechanism is a biaxial revolution mechanism that enables the imaging apparatus to revolve in a first direction and a second direction that intersects with the first direction, and
   the shake correction component is at least one of an optical shake correction mechanism or an electronic shake correction component.

13. The imaging support device according to claim 12, wherein the optical shake correction mechanism is at least one of a lens moving-type shake correction mechanism or an imaging element moving-type shake correction mechanism.

14. The imaging support device according to claim 1, wherein the processor is configured to output a movement amount required for moving the position of the target subject image to the specific position by means of the revolution mechanism and the shake correction component, to an exterior.

15. The imaging support device according to claim 1, wherein a movement amount required for moving the position of the target subject image to the specific position by means of the revolution mechanism and the shake correction component is decided based on a movement velocity of the target subject in a case in which the target subject is moving.

16. The imaging support device according to claim 15, wherein the movement velocity includes a plurality of velocities obtained by breaking down the movement velocity into a plurality of different directions.

17. An imaging apparatus, comprising:
the imaging support device according to claim 1; and
the imaging element,
wherein the imaging support device supports imaging for the imaging element.

18. An imaging system, comprising:
the imaging apparatus according to claim 17; and
a control device that performs at least one of control for displaying on a display an image in which an adjustment result of the position of the target subject image is reflected based on a movement amount required for moving the position of the target subject image to the specific position by means of the revolution mechanism and the shake correction component, or control for storing image data indicating the image in which the adjustment result is reflected in a storage device.

19. An imaging support system, comprising:
the imaging support device according to claim 1; and
the revolution mechanism and the shake correction component,
wherein the processor is configured to move a position of a target subject image showing a target subject to a specific position by means of the revolution mechanism and the shake correction component.

20. An imaging system, comprising:
an imaging element;
an imaging support device that includes a processor and a memory incorporated in or coupled to the processor, and that supports imaging performed by an imaging apparatus including the imaging element; and
a revolution mechanism that causes the imaging apparatus to revolve and a shake correction component that corrects a shake that occurs as a result of a vibration imparted to the imaging apparatus,
wherein the processor is configured to move a position of a target subject image showing a target subject to a specific position by means of the revolution mechanism and the shake correction component, and
wherein a resolution for adjusting the position of the target subject image by means of the shake correction component is higher than a resolution for adjusting the position of the target subject image by means of the revolution mechanism.

21. An imaging support method of supporting imaging performed by an imaging apparatus including an imaging element, the imaging support method comprising:
moving a position of a target subject image showing a target subject to a specific position by means of a revolution mechanism that causes the imaging apparatus to revolve and a shake correction component that corrects a shake that occurs as a result of a vibration imparted to the imaging apparatus,
wherein a resolution for adjusting the position of the target subject image by means of the shake correction component is higher than a resolution for adjusting the position of the target subject image by means of the revolution mechanism.

22. A non-transitory computer-readable storage medium storing a program executable by a computer to perform processing for supporting imaging performed by an imaging apparatus including an imaging element, the processing comprising:
moving a position of a target subject image showing a target subject to a specific position by means of a revolution mechanism that causes the imaging apparatus to revolve and a shake correction component that corrects a shake that occurs as a result of a vibration imparted to the imaging apparatus,
wherein a resolution for adjusting the position of the target subject image by means of the shake correction component is higher than a resolution for adjusting the position of the target subject image by means of the revolution mechanism.

\* \* \* \* \*